US00RE39262E

(19) United States
(12) Reissued Patent
Hirose et al.

(10) Patent Number: US RE39,262 E
(45) Date of Reissued Patent: Sep. 5, 2006

(54) POLISHING APPARATUS INCLUDING TURNTABLE WITH POLISHING SURFACE OF DIFFERENT HEIGHTS

(75) Inventors: Masayoshi Hirose, Yokohama (JP); Yoshimi Sasaki, Atsugi (JP); Akira Ogata, Yokohama (JP); Seiji Ishikawa, Yokohama (JP); Tamami Takahashi, Yamato (JP); Hirokuni Hiyama, Tokyo (JP); Yutaka Wada, Yokohama (JP)

(73) Assignee: Ebara Corporation, Tokyo (JP)

(21) Appl. No.: 09/821,046

(22) Filed: Feb. 28, 2002

Related U.S. Patent Documents

Reissue of:
(64) Patent No.: 5,888,126
Issued: Mar. 30, 1999
Appl. No.: 08/590,836
Filed: Jan. 24, 1996

(30) Foreign Application Priority Data

Jan. 25, 1995 (JP) ..... 7-028722
Jul. 20, 1995 (JP) ..... 7-206594

(51) Int. Cl.
*B24B 29/02* (2006.01)

(52) U.S. Cl. ..... 451/287; 451/288; 451/495; 451/527

(58) Field of Classification Search ..... 451/36, 451/41, 59, 63, 293, 285, 287, 288, 289, 451/290, 495, 520, 527, 528, 530, 548, 550
See application file for complete search history.

(56) References Cited

U.S. PATENT DOCUMENTS 3,603,042 A * 9/1971 Boettcher ..... 451/288
5,081,795 A * 1/1992 Tanaka et al. ..... 451/288
5,212,910 A * 5/1993 Breivogel et al. ..... 451/530
5,216,843 A * 6/1993 Breivogel et al. ..... 451/285
5,297,364 A * 3/1994 Tuttle ..... 451/527
5,435,772 A * 7/1995 Yu ..... 451/63
5,558,563 A * 9/1996 Cote et al. ..... 451/41
5,562,529 A * 10/1996 Kishii et al. ..... 451/36
5,564,965 A * 10/1996 Tanaka et al. ..... 451/287

FOREIGN PATENT DOCUMENTS

JP 26596 * 2/1979 ..... 451/288
JP 117064 * 6/1986 ..... 451/288
JP 3-259520 * 11/1991

* cited by examiner

*Primary Examiner*—Timothy V. Eley
(74) *Attorney, Agent, or Firm*—Wenderoth, Lind & Ponack, L.L.P.

(57) ABSTRACT

A polishing apparatus includes a turntable with an abrasive cloth mounted on an upper surface thereof, and a top ring disposed above the turntable for supporting a workpiece to be polished and pressing the workpiece against the abrasive cloth under a predetermined pressure. The turntable and the top ring are movable relatively to each other to polish a surface of the workpiece supported by the top ring with the abrasive cloth. The abrasive cloth has a projecting region on a surface thereof for more intensive contact with the workpiece than other surface regions of the abrasive cloth. The projecting region has a smaller dimension in a radial direction of the turntable than a diameter of the workpiece when the projecting region is held in contact with the workpiece. A position of the projection region is determined on the basis of an area in which the projecting region acts on the workpiece.

25 Claims, 21 Drawing Sheets

POLISHING APPARATUS INCLUDING TURNTABLE WITH POLISHING SURFACE OF DIFFERENT HEIGHTS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a polishing apparatus, and more particularly to a polishing apparatus for polishing a workpiece such as a semiconductor wafer to a flat mirror finish.

2. Description of the Related Art

Recent rapid progress in semiconductor device integration demands smaller and smaller wiring patterns or interconnections and also narrower spaces between interconnections which connect active areas. One of the processes available for forming such interconnection is photolithography. Though the photolithographic process can form interconnections that are at most 0.5 μm wide, it requires that surfaces which pattern images are to be focused on by a stepper be as flat as possible because the depth of focus of the optical system is relatively small.

It is therefore necessary to make the surfaces of semiconductor wafers flat for photolithography. One customary way of flattening the surfaces of semiconductor wafers is to polish them with a polishing apparatus.

Conventionally, a polishing apparatus has a turntable and a top ring which rotate at respective individual speeds. An abrasive cloth is attached to the upper surface of the turntable. A semiconductor wafer to be polished is placed on the abrasive cloth and clamped between the top ring and the turntable. During operation, the top ring exerts a certain pressure on the turntable, and the surface of the semiconductor wafer held against the abrasive cloth is therefore polished to a flat mirror finish while the top ring and the turntable are rotating.

The polishing apparatus is required to have such performance that the surfaces of semiconductor wafers have a highly accurate flatness. Therefore, it is preferable that the lower end surface of the top ring which holds a semiconductor wafer and the contact surface of the abrasive cloth which is held in contact with the semiconductor wafer, and hence the surface of the turntable to which the abrasive cloth is attached, have a highly accurate flatness, and those surfaces which are highly accurately flat have been used in the art.

It is known that the polishing action of the polishing apparatus is affected not only by the configurations of the holding surface of the top ring and the contact surface of the abrasive cloth, but also by the relative speed between the abrasive cloth and the semiconductor wafer, the distribution of pressure applied to the surface of the semiconductor wafer which is being polished, the amount of the abrasive liquid on the abrasive cloth, and the period of time when the abrasive cloth has been used. It is considered that the surface of the semiconductor wafer can be highly accurately flat if the above factors which affect the polishing action of the polishing apparatus are equalized over the entire surface of the semiconductor wafer to be polished.

However, some of the above factors can easily be equalized over the entire surface of the semiconductor wafer, but the other factors cannot be equalized. For example, the relative speed between the abrasive cloth and the semiconductor wafer can easily be equalized by rotating the turntable and the top ring at the same rotational speed and in the same direction. However, it is difficult to equalize the amount of the abrasive liquid on the abrasive cloth because of centrifugal forces imposed on the abrasive liquid.

The above approach which tries to equalize all the factors affecting the polishing action, including the flatnesses of the lower end surface of the top ring and the upper surface of the abrasive cloth on the turntable, over the entire surface of the semiconductor wafer to be polished poses limitations on efforts to make the polished surface of the semiconductor wafer flat, often resulting in a failure to accomplish a desired degree of flatness of the polished surface.

It has been customary to achieve a more accurate flatness by making the holding surface of the top ring concave or convex to develop a certain distribution of pressure on the surface of the semiconductor wafer for thereby correcting irregularities of the polishing action which are caused by an irregular entry of the abrasive liquid and variations in the period of time when the abrasive cloth has been used. It has also been practiced to correct irregularities of the polishing action by using a top ring which has a diaphragm and changing a distribution of pressure applied by the top ring while the semiconductor wafer is being polished.

However, various problems have arisen in the case where a specific configuration is applied to the holding surface of the top ring. Specifically, since the holding surface of the top ring is held in contact with the semiconductor wafer at all times, the holding surface of the top ring affects the polishing action continuously all the time while the semiconductor wafer is being polished. Because the configuration of the holding surface of the top ring has direct effect on the polishing action, it is highly complex to correct irregularities of the polishing action by intentionally making the holding surface of the top ring concave or convex, i.e., non-flat. If the holding surface of the top ring which has been made intentionally concave or convex is inadequate, the polished surface of the semiconductor wafer may not be made as flat as desired, or irregularities of the polishing action may not be sufficiently corrected, so that the polished surface of the semiconductor wafer may not be sufficiently flat.

In addition, inasmuch as the holding surface of the top ring is of substantially the same size as the surface of the semiconductor wafer to be polished, the holding surface of the top ring is required to be made irregular in a very small area. Because such surface processing is highly complex, it is not easy to correct irregularities of the polishing action by means of the configuration of the holding surface of the top ring.

The conventional polishing apparatuses, particularly those for polishing semiconductor wafers, are required to polish workpiece surfaces to higher flatness. There have not been available suitable means and apparatus for polishing workpieces to shapes which are intentionally not flat or for polishing workpieces such that desired localized areas of workpiece surfaces are polished to different degrees.

SUMMARY OF THE INVENTION

It is therefore an object of the present invention to provide a polishing apparatus which can easily correct irregularities of a polishing action on a workpiece such as a semiconductor wafer, and polish a workpiece with an intensive polishing action on a desired localized area thereof.

According to a first aspect of the present invention, there is provided a polishing apparatus comprising: a turntable with an abrasive cloth mounted on an upper surface thereof; a top ring disposed above the turntable for supporting a workpiece to be polished and pressing the workpiece against the abrasive cloth; and moving means for moving the turntable and the top ring relatively to each other to polish a surface of the workpiece supported by the top ring with the abrasive cloth; wherein the abrasive cloth has a projecting region on a surface thereof. The projecting region has a smaller dimension in a radial direction of the turntable than a diameter of the workpiece when the projecting region is held in contact with the workpiece, and a position of the projecting region is determined on the basis of an area in which the projecting region acts on the workpiece.

According to the first aspect of the present invention, while the workpiece is being polished, the workpiece intermittently passes over the projecting region on the surface of the abrasive cloth which is held in contact with the workpiece. Thus a certain area of the workpiece is therefore contacted by the projecting region, and other areas are contacted by a flat portion of the abrasive cloth. Since the projecting region produces a greater polishing action than the flat portion of the abrasive cloth, the area of the workpiece that is contacted by the projecting region is polished to a greater degree than the other areas contacted by the flat portion of the abrasive cloth. By determining the position of the projecting region in consideration of the area in which the projecting region acts on the workpiece, it is possible to polish a desired area of the workpiece more intensively.

Determining the position of the projecting region in consideration of the area in which the projecting region acts on the workpiece means that the size and position of the projecting region are selected in consideration of a polished surface produced by the shape, size, position, and height of the projecting region or projecting regions if plural projecting regions are employed. In the case where plural projecting regions are employed, even if each of the projecting regions is of a simple shape such as a circular shape, the number and positions of the projecting regions may be suitably selected in a relatively wide region on the abrasive cloth, thus making it possible to control a distribution of the polishing rate of the workpiece. Therefore, a desired polished surface of the workpiece can be obtained.

If the workpiece is a semiconductor wafer, for example, which is to be polished flatwise, the position of the projecting region is determined so as to intensively polish an area where the polishing rate would otherwise be too small, thereby correcting the polishing irregularities. In this manner, the workpiece can be polished to a desired flatness.

In the case where the projecting region is selectively formed mechanically, switching between the formation of the projecting region and the elimination of the projecting region can easily be carried out. Therefore, it is easy to vary a combination of plural projecting regions in accordance with the workpiece to be polished and the conditions in which it is to be polished.

According to a second aspect of the present invention, there is provided a polishing apparatus comprising: a turntable with an abrasive cloth mounted on an upper surface thereof; a top ring disposed above the turntable for supporting a workpiece to be polished and pressing the workpiece against the abrasive cloth; and moving means for moving the turntable and the top ring relatively to each other to polish a surface of the workpiece supported by the top ring with the abrasive cloth; wherein the turntable has a recess defined in the upper surface thereof. The recess has a smaller dimension in a radial direction of the turntable than a diameter of the workpiece, and a position of the recess is determined on the basis of an area in which the recess acts on the workpiece.

According to the second aspect of the present invention, while the workpiece is being polished, the workpiece intermittently passes over the recess in the upper surface of the turntable. Since the abrasive cloth over the recess is depressed under the pressure of the workpiece, the abrasive cloth over the recess produces a weaker polishing action than the flat portion of the abrasive cloth. Therefore, the area of the workpiece that is contacted by the flat portion of the abrasive cloth is polished to a greater degree than the portion of the abrasive cloth over the recess. By determining the position of the recess in consideration of the area in which the recess acts on the workpiece, it is possible to polish a desired area of the workpiece more less intensively.

In the case where plural recesses are employed, they may be combined in the same manner as the projecting regions, thus making it possible to obtain a desired polished surface of the workpiece. If the workpiece is a semiconductor wafer, for example, which is to be polished flatwise, then the position of the recess is determined so as to less intensively polish an area where the polishing rate would otherwise be too large, thus correcting the polishing irregularities. Therefore, the workpiece can be polished to a desired flatness.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
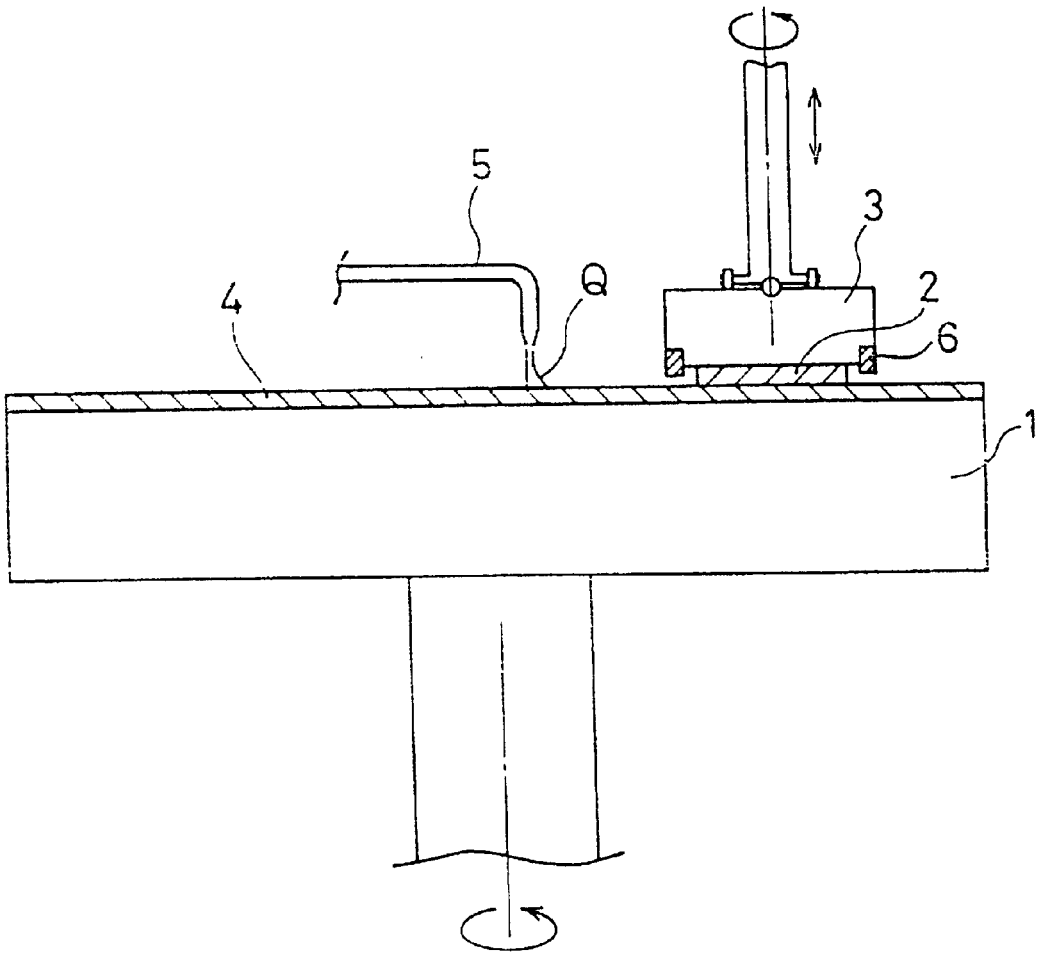
FIG. 1 is a vertical cross-sectional view of a polishing apparatus according to an embodiment of the present invention.

As shown in FIG. 1, a polishing apparatus according to an embodiment of the present invention has a turntable 1 and a top ring 3 positioned above the turntable 1 for holding a semiconductor wafer 2 and pressing the semiconductor wafer 2 against the turntable 1. Top ring 3 has a wafer-holding area over which the wafer is held by the top ring. The turntable 1 is rotatable about its own axis as indicated by an arrow by a motor (not shown) which is coupled through a shaft to the turntable 1. An abrasive cloth 4 is attached to an upper surface of the turntable 1.

The top ring 3 is coupled to a motor (not shown) and also to an air cylinder (not shown). The top ring 3 is vertically movable and rotatable about its own axis as indicated by the arrows by the motor and the air cylinder. The top ring 3 can therefore press the semiconductor wafer 2 against the abrasive cloth 4 under a desired pressure. A guide ring 6 is mounted on the outer circumferential edge of the lower surface of the top ring 3 for preventing the semiconductor wafer 2 from being disengaged from the top ring 3.

An abrasive liquid supply nozzle 5 is disposed directly above the turntable 1 for supplying an abrasive liquid Q containing an abrasive material onto the abrasive cloth 4 mounted on the turntable 1.

The polishing apparatus operates as follows: The semiconductor wafer 2 is held on the lower surface of the top ring 3, and pressed against the abrasive cloth 4 on the upper surface of the turntable 1 which is being rotated, by the air cylinder. The abrasive liquid supply nozzle 5 supplies the abrasive liquid Q onto the abrasive cloth 4, and the supplied abrasive liquid Q is retained on the abrasive cloth 4. The lower surface of the semiconductor wafer 2 is polished in such a state that the abrasive liquid Q is present between the lower surface of the semiconductor wafer 2 and the abrasive cloth 4.

Figure 2A:
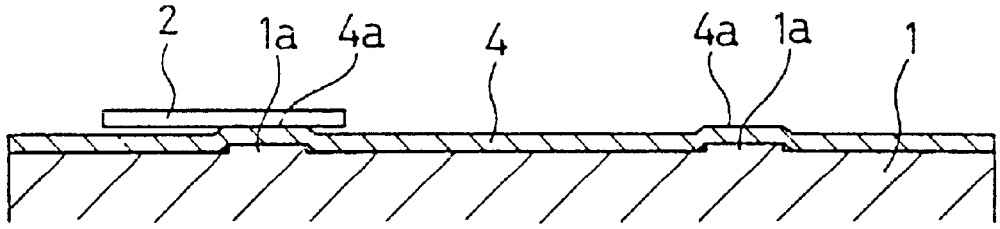
FIG. 2A is an enlarged cross-sectional view of a turntable and an abrasive cloth of the polishing apparatus.
Figure 2B:
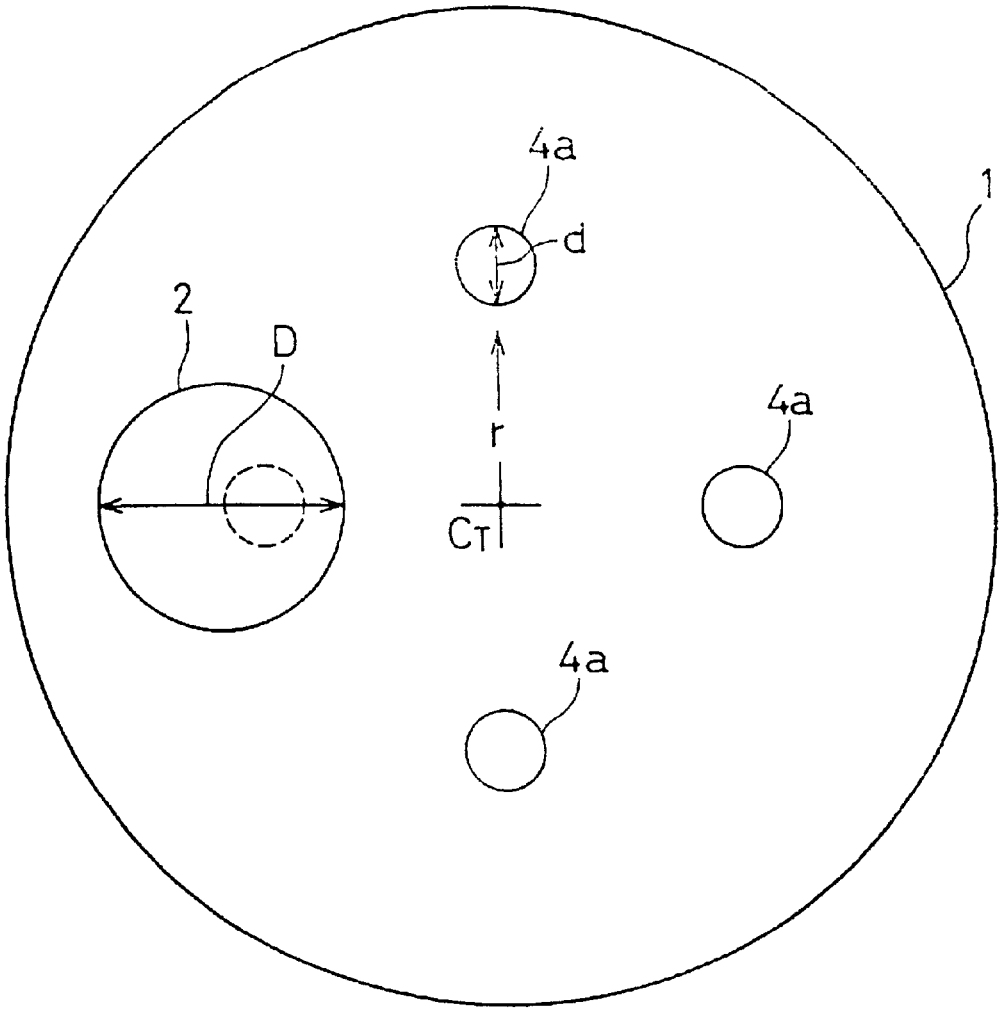
FIG. 2B is a plan view of the turntable and the abrasive cloth of the polishing apparatus.

FIGS. 2A and 2B show the turntable 1 and the abrasive cloth 4 in detail. As shown in FIG. 2A, the turntable 1 has circular projecting regions 1a on its upper surface which form respective circular projecting regions 4a on the upper surface of the abrasive cloth 4 which is held in contact with the semiconductor wafer 2. While each of the projecting regions 4a is being held in contact with the semiconductor wafer 2, the length "d" of each projecting region 4a in the radial direction (of the turntable) indicated by the arrow "r" (see FIG. 2B) across the turntable 1 is smaller than the diameter "D" of the semiconductor wafer 2, and the position of each projecting region 4a is determined based on an area in which the projecting region 4a acts on the semiconductor wafer 2.

The abrasive cloth 4 generally comprises fibers impregnated with urethane resin or polyurethane foam. Typically, the abrasive cloth 4 may be made of SUBA (trade name) or IC-1000 (trade name) manufactured by Rodel Products Corporation.

The projecting regions 1a on the turntable 1 and hence the projecting regions 4a on the abrasive cloth 4 serve to correct the polishing rate of the semiconductor wafer 2. The projecting regions 4a offer the following advantages: The projecting regions 4a act on the semiconductor wafer 2 only during the period of time when they pass over the surface of the semiconductor wafer 2, rather than during the entire period of time when the semiconductor wafer 2 is polished by the top ring 3 and the abrasive cloth 4. Specifically, the projecting regions 4a act for a shorter period of time than the time during which the top ring 3 is held in contact with the semiconductor wafer 2, i.e. at all times. Even if each of the projecting regions 4a has a height of about 0.1 mm above the flat surface of the abrasive cloth 4, it causes a difference of the polishing rate only by about several hundred angstroms/min. This means that the polished surface of the semiconductor wafer can be controlled at a depth of about several hundred angstroms by controlling the height of the projecting region to be on the order of 0.1 mm.

The polishing action of the projecting regions 4a, on the surface of the abrasive cloth 4, which are held in contact with the semiconductor wafer 2 will be described below with reference to FIGS. 3A and 3B through 10A and 10B.

Figure 3A:
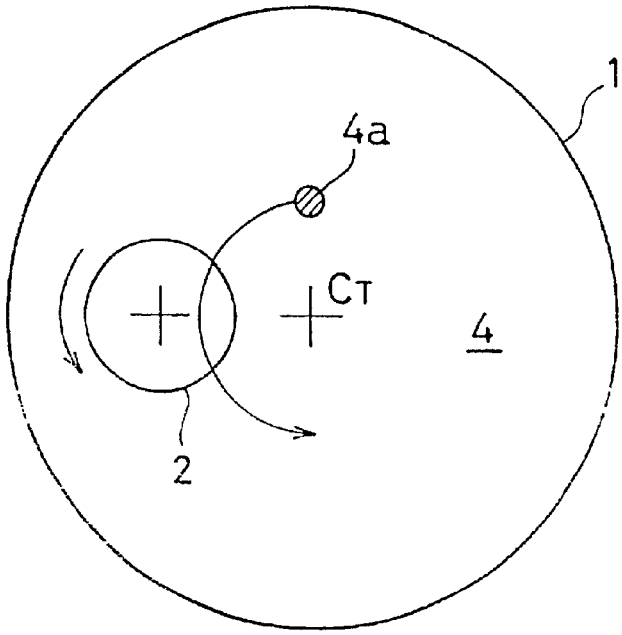
FIGS. 3A and 3B are plan views showing the manner in which the polishing apparatus operates, with a single circular projecting region on the abrasive cloth.
Figure 3B:
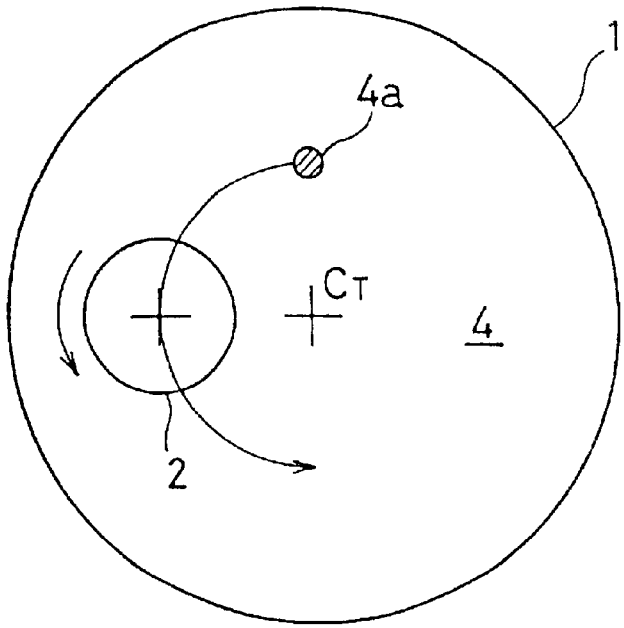

FIGS. 3A and 3B are plan views of the abrasive cloth 4, showing a single circular projecting region 4a on the surface of the abrasive cloth 4 which is held in contact with the semiconductor wafer 2. In FIG. 3A, the projecting region 4a is positioned so as to pass through only a certain inside area of the semiconductor wafer 2. In FIG. 3B, the projecting region 4a is positioned so as to pass through a central area of the semiconductor wafer 2. It is assumed that the turntable 1 and the semiconductor wafer 2 are rotated at the same angular velocity and in the same direction.

Figure 4A:
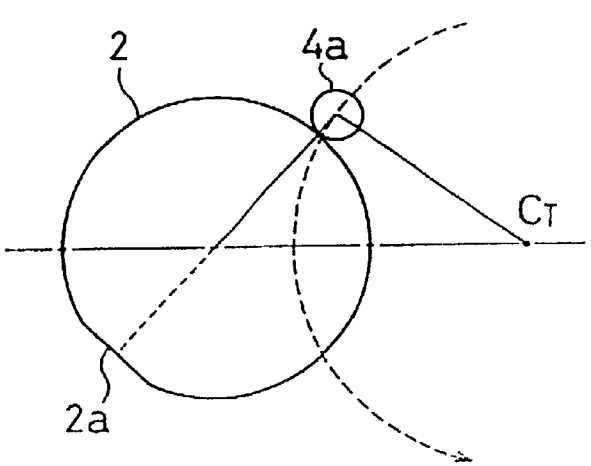
FIGS. 4A through 4D are plan views showing the manner in which the projecting region shown in FIG. 3A operates.

The path of the projection region 4a on the abrasive cloth 4 within the inside area of the semiconductor wafer 2 as shown in FIG. 3A will be described below with reference to FIGS. 4A through 4D. FIG. 4A shows the instant when the projecting region 4a contacts an outer circumferential edge of the semiconductor wafer 2 while the projecting region 4a rotates about the center $C_T$ of the turntable 1. At this time, an orientation flat 2a formed on the outer periphery of the semiconductor wafer 2 is positioned in diametrically opposite relation to the projecting region 4a.

Figure 4B:
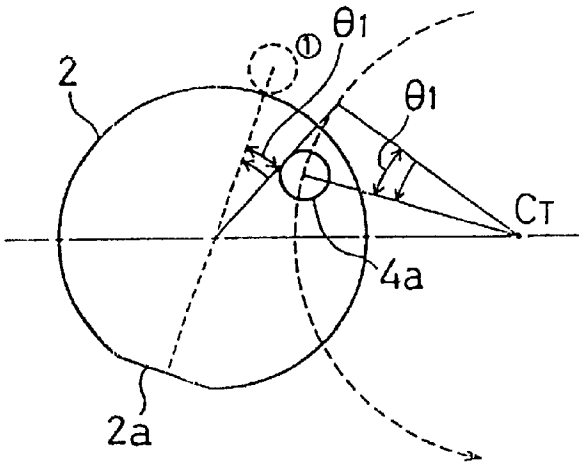

When the turntable 1 rotates through an angle $\theta_1$ from the position shown in FIG. 4A, the projecting region 4a is positioned in its entirety within the inside area of the semiconductor wafer 2 as shown in FIG. 4B. Since the turntable 1 and the semiconductor wafer 2 are rotated at the same angular velocity and in the same direction, the semiconductor wafer 2 also rotates through the angle $\theta_1$. Therefore, when the semiconductor wafer 2 is in the position shown in FIG. 4B, the position in which the projecting region 4a was held in contact with the semiconductor wafer 2 as shown in FIG. 4A is indicated by a broken-line circle 1 in FIG. 4B.

Figure 4C:
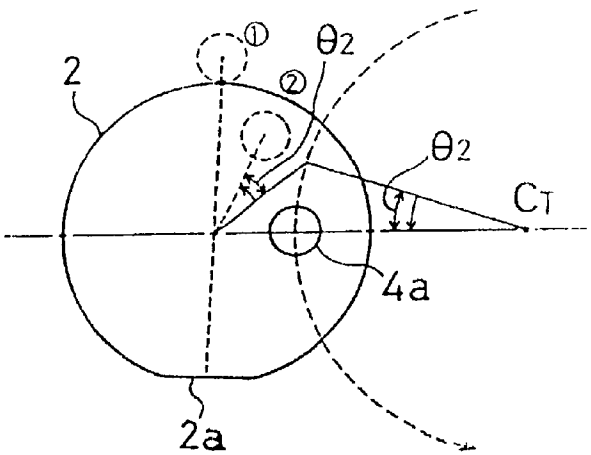

When the turntable 1 further rotates through an angle $\theta_2$ from the position shown in FIG. 4B to the position shown in FIG. 4C, the semiconductor wafer 2 also rotates through the angle $\theta_2$. Therefore, when the semiconductor wafer 2 is in the position shown in FIG. 4C, the positions in which the projecting region 4a was held in contact with the semiconductor wafer 2 as shown in FIGS. 4A and 4B are indicated respectively by broken-line circles $\hat{1}$, $\hat{2}$ in FIG. 4C. The position in which the projecting region 4a was held in contact with the semiconductor wafer 2 as shown in FIG. 4A is diametrically opposite to the orientation flat 2a of the semiconductor wafer 2 at all times.

Figure 4D:
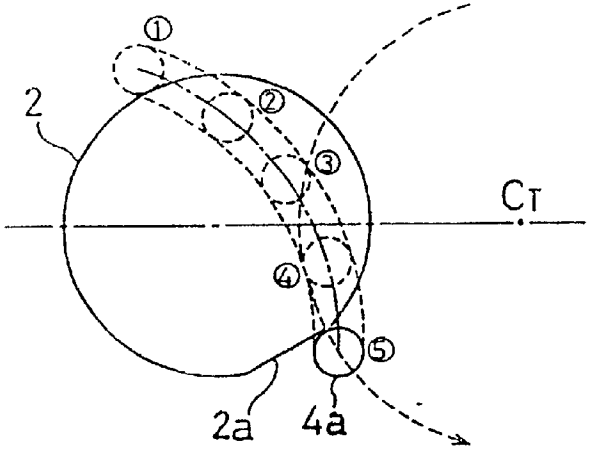
Figure 5:
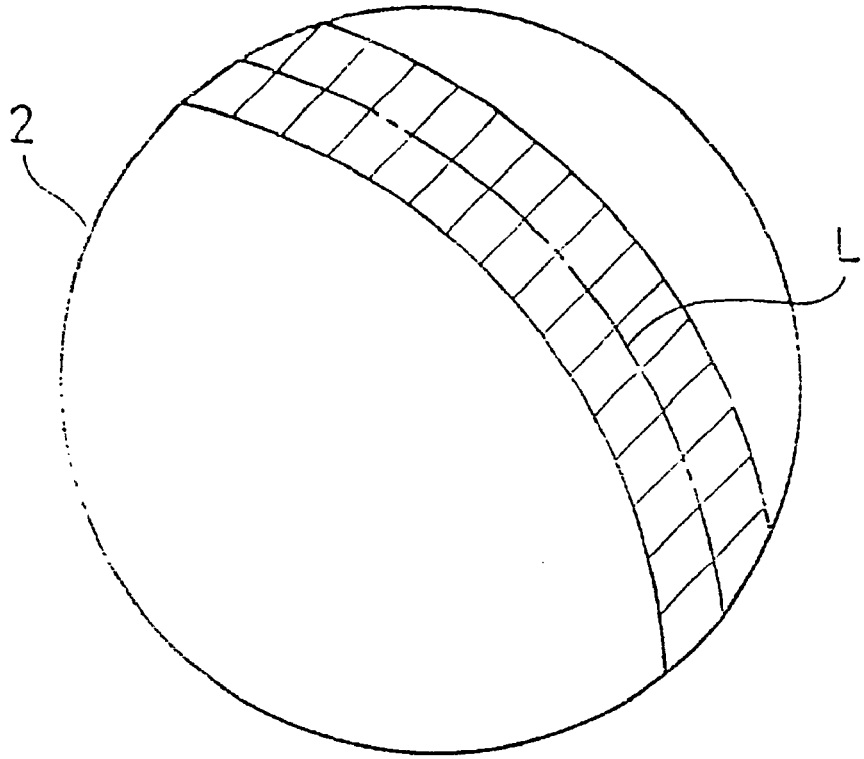
FIG. 5 is a plan view showing an area contacted by the projecting region shown in FIG. 3A.

Because the turntable 1 and the semiconductor wafer 2 rotate in this manner, the projecting region 4a passes over the surface of the semiconductor wafer 2 through a path indicated by $\hat{1}$, $\hat{2}$, $\hat{3}$, $\hat{4}$, $\hat{5}$ in FIG. 4D. Accordingly, the projecting region 4a contacts an area of the lower surface of the semiconductor wafer 2 which is shown hatched in FIG. 5. In FIG. 5, the center of the projecting region 4a which is of a circular shape follows a dot-and-dash-line path L extending in and along the hatched area.

Figure 6:
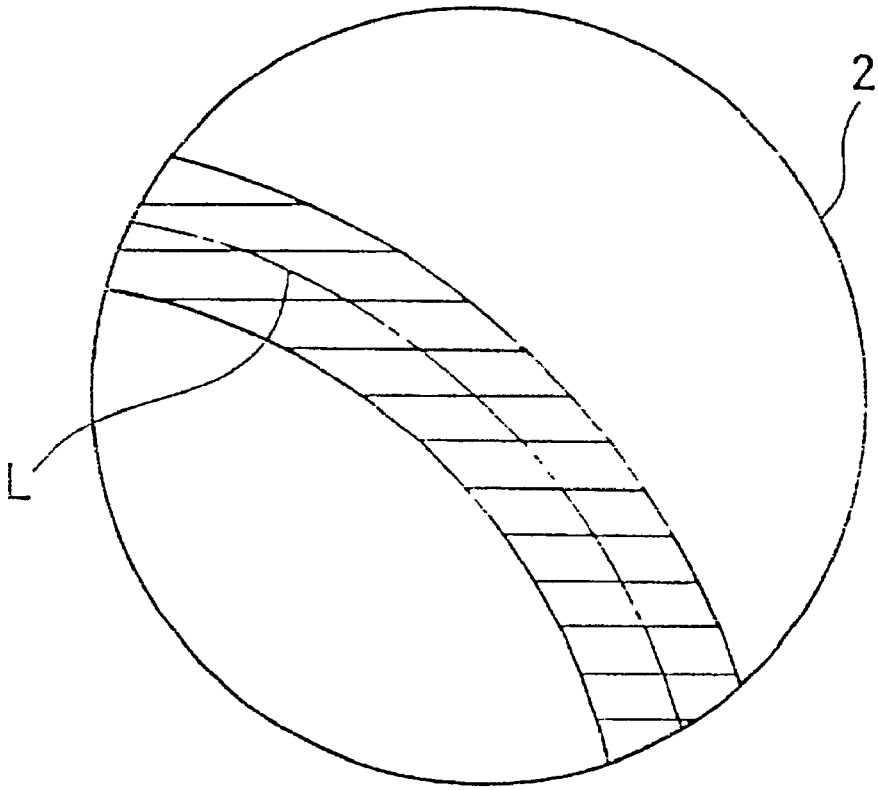
FIG. 6 is a plan view showing an area contacted by the projecting region shown in FIG. 3B.

In the case where the projecting region 4a is positioned so as to pass through a central area of the semiconductor wafer 2, as shown in FIG. 3B, the locus of the projecting region 4a is shown in FIG. 6.

Figure 7:
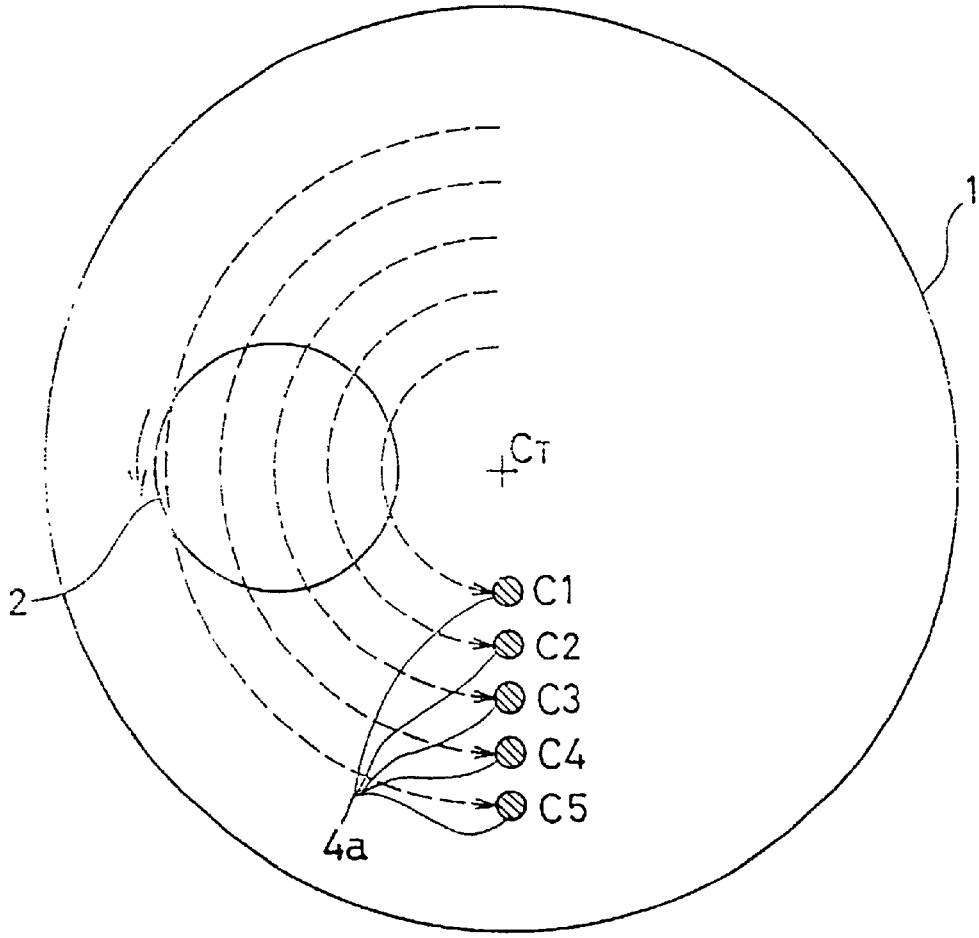
FIG. 7 is a plan view showing the manner in which the polishing apparatus operates, the view illustrating how a single projecting region may be positioned in different locations on the abrasive cloth.
Figure 8:
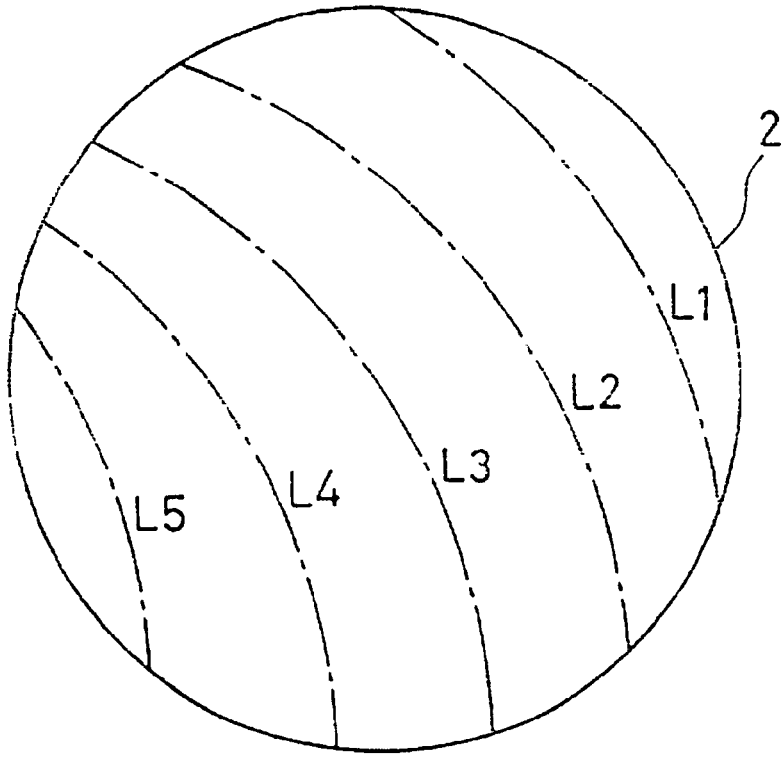
FIG. 8 is a plan view showing the paths of centers of areas in which the projecting region in each position affects the surface of a semiconductor wafer to be polished in the embodiment of FIG. 7.
Figure 9:
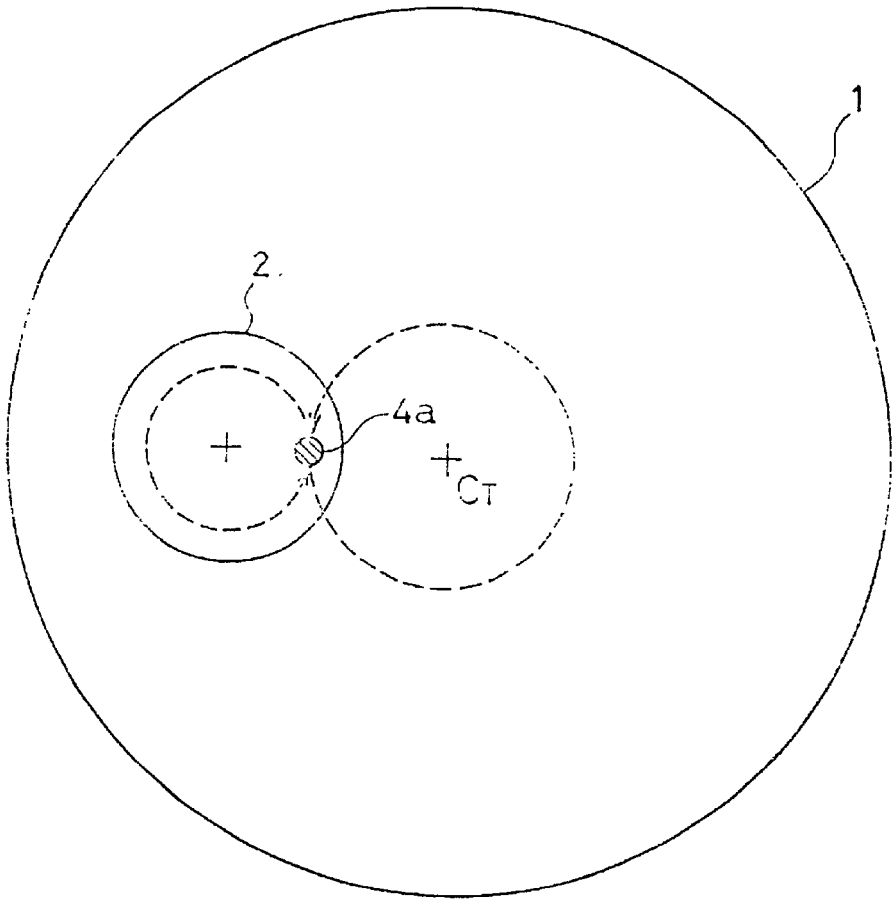
FIG. 9 is a plan view showing a polishing action of the polishing apparatus.

Therefore, the projecting region 4a passes through different surface areas of the semiconductor wafer 2 in accordance with the position of the projecting region 4a on the abrasive cloth 4. FIG. 7 shows how the projecting region 4a may be positioned in other locations on the abrasive cloth 4, in addition to the locations of the projecting region 4a shown in FIGS. 3A and 3B. In FIG. 7, the projection region 4a is positioned in each of locations C1, C2, C3, C4, C5 radially spaced at successive distances from the center $C_T$ of the turntable 1. As shown in FIG. 8, the projecting region 4a positioned in each of locations C1, C2, C3, C4, C5 has its loci L1, L2, L3, L4, L5, respectively, within the lower surface of the semiconductor wafer 2 when the turntable 1 and the semiconductor wafer 2 rotate in unison with each other. The loci L1, L2, L3, L4, L5 shown in FIG. 8 are viewed from the reverse side of the semiconductor wafer 2, i.e., the upper surface of the semiconductor wafer 2 which is opposite to the surface thereof which is being polished.

In the case where the single projecting region 4a is employed as shown in FIGS. 3A and 3B through 8, if the turntable 1 and the semiconductor wafer 2 are rotated at the same rotational speed to uniformize the relative speed between the turntable 1 and the semiconductor wafer 2 on the surface of the semiconductor wafer 2 to be polished, then the projecting region 4a passes through the same position on the semiconductor wafer 2 at all times. Specifically, when the turntable 1 makes one revolution from the position shown in FIG. 9, since the semiconductor wafer 2 also makes one revolution, the projecting region 4a rotates from the illustrated position and back again to the illustrated position. Since the projecting region 4a passes through the same position on the semiconductor wafer 2 at all times, only a certain localized area of the semiconductor wafer 2 tends to be excessively polished by the projecting region 4a. Such a shortcoming can be avoided by rotating the turntable 1 and the semiconductor wafer 2 at different rotational speeds while polishing the semiconductor wafer 2. When the turntable 1 and the semiconductor wafer 2 are rotated at different rotational speeds, the projecting region 4a acts on a different area on the semiconductor wafer 2 each time when the turntable 1 makes one revolution. Accordingly, the semiconductor wafer 2 is prevented from being polished only in a localized area thereof.

The paths of the projecting region 4a which are illustrated above are based on the rotation of the turntable 1 and the top ring 3 at the same rotational speed. The projecting region 4a moves along different paths when the turntable 1 and the semiconductor wafer 2 are rotated at different rotational speeds. However, if the difference between the rotational speeds of the turntable 1 and the semiconductor wafer 2 is not significantly large, then the paths of the projecting region 4a remain substantially the same.

Figure 10A:
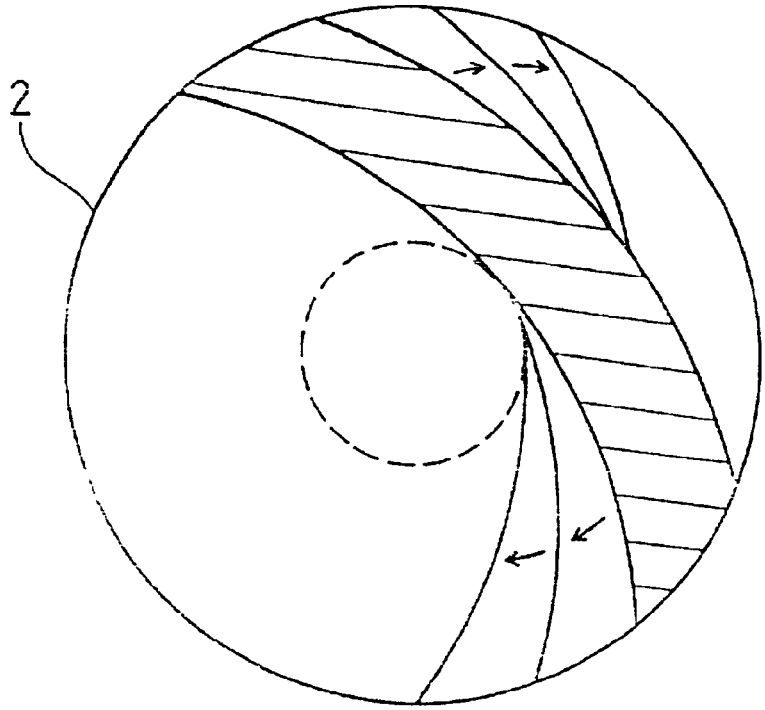
FIGS. 10A and 10B are views showing the manner in which the polishing apparatus makes a planetary motion.

When the turntable 1 and the semiconductor wafer 2 are rotated at different rotational speeds, the projecting region 4a passes along a different path on the semiconductor wafer 2 each time when the turntable 1 makes one revolution, until it contacts the entire surface of the semiconductor wafer 2, as shown in FIG. 10A. In FIG. 10A, the projecting region 4a contacts the semiconductor wafer 2 in a hatched area which is progressively moved as indicated by the arrows, until the projecting region 4a contacts an entire area outside the circle indicated by the broken line.

Figure 10B:
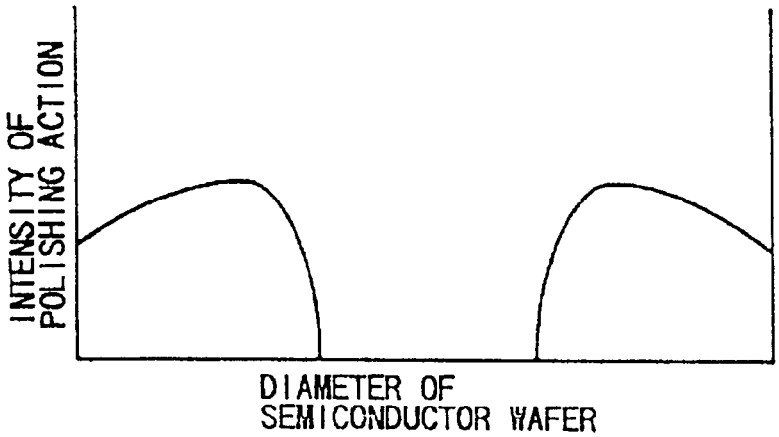

In an area of the semiconductor wafer 2 which is polished by the projecting region 4a, the center of the projecting region 4a which is of a circular shape acts on the semiconductor wafer 2 over a longer distance. Therefore, the projecting region 4a acts more intensively on some regions and less intensively on other regions within the area of the semiconductor wafer 2 which is polished by the projecting region 4a. Such different degrees of the polishing action of the projecting region 4a are illustrated in FIG. 10B.

The area of the semiconductor wafer 2 which is polished by the projecting region 4a is of a concentric annular shape on the surface of the semiconductor wafer 2. The profile of the degree (referred to as intensity of polishing action) to which the projecting region 4a acts on, i.e., polishes the surface of the semiconductor wafer 2, is determined by the proportion of the period of time during which the projecting region 4a passes over the surface of the semiconductor wafer 2.

Even when the turntable 1 and the semiconductor wafer 2 are rotated at the same rotational speed, the top ring 3 may have such structure to impart a planetary motion to the semiconductor wafer 2 for thereby rotating the semiconductor wafer 2 at a rotational speed different from the rotational speed of the top ring 3, as disclosed in Japanese patent application No. 5-321260 (corresponding to U.S. Pat. No. 5,398,459). Such an arrangement is also effective in preventing the semiconductor wafer 2 from being polished only in a localized area thereof.

While use of only the single projecting region 4a has been described above, a plurality of projecting regions may be used to produce a more intensive polishing action on the semiconductor wafer 2. The number of projecting regions used may be selected depending on the degree or extent to which the semiconductor wafer 2 is to be polished.

The size of projecting regions as well as the number of projecting regions is also one of the factors that affect the polishing action on the semiconductor wafer 2. Therefore, in a selected local area or the entire area of the semiconductor wafer, the polishing rate of the semiconductor wafer 2 can precisely be controlled by selecting the position, number, and size of projecting regions. Selection of the position, number, and size of projecting regions for an optimum combination may automatically be carried out by a computer or the like.

Figure 11A:
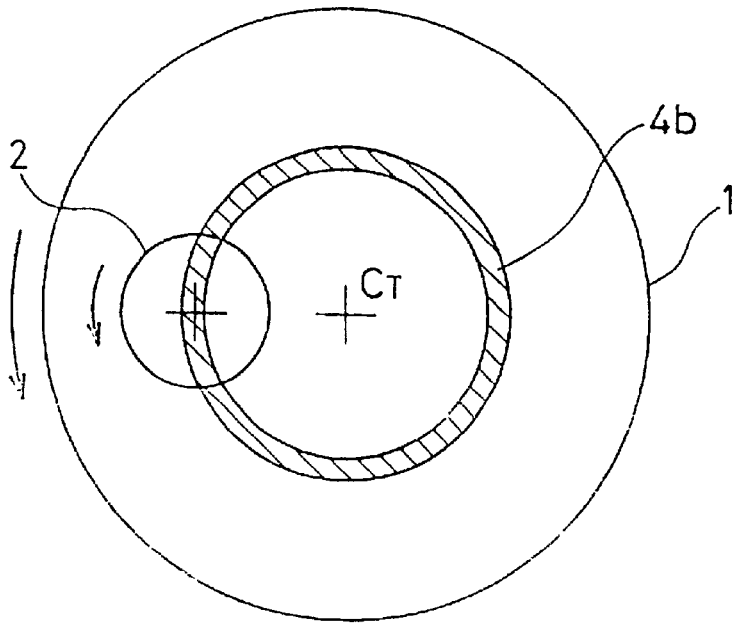
FIGS. 11A and 11B are plan views showing the manner in which the polishing apparatus operates, with a single annular projecting region on the abrasive cloth.
Figure 11B:
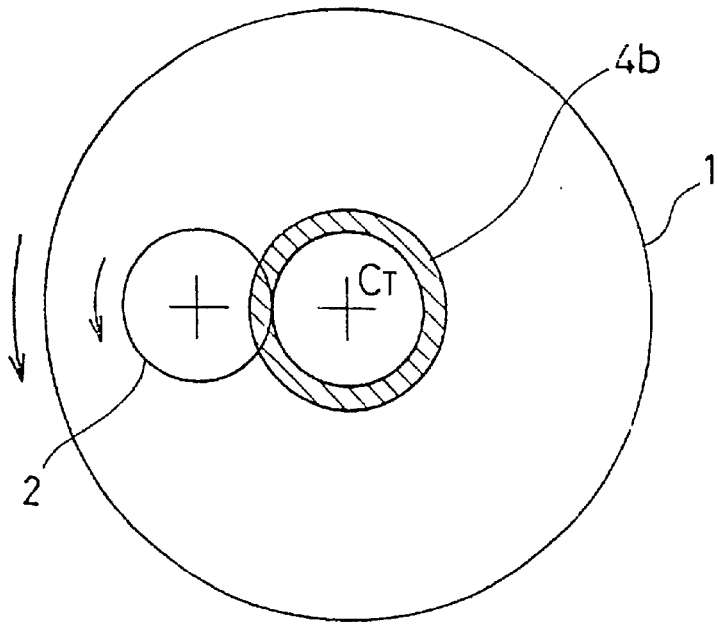

Annular projecting regions 4b of different sizes on the abrasive cloth 4 will be described below with reference to FIGS. 11A, 11B and 12A, 12B. FIG. 11A shows an annular projecting region 4b positioned concentrically with the center $C_T$ of the turntable 1, the projecting region 4b being positioned so as to extend through the center of the semiconductor wafer 2. FIG. 11B shows a projecting region 4b positioned concentrically with the center $C_T$ of the turntable 1, the projecting region 4b being positioned so as to extend through an outer circumferential edge of the semiconductor wafer 2. In each of FIGS. 11A and 11B, the projecting region 4b is held in contact with the semiconductor wafer 2 at all times.

Figure 12A:
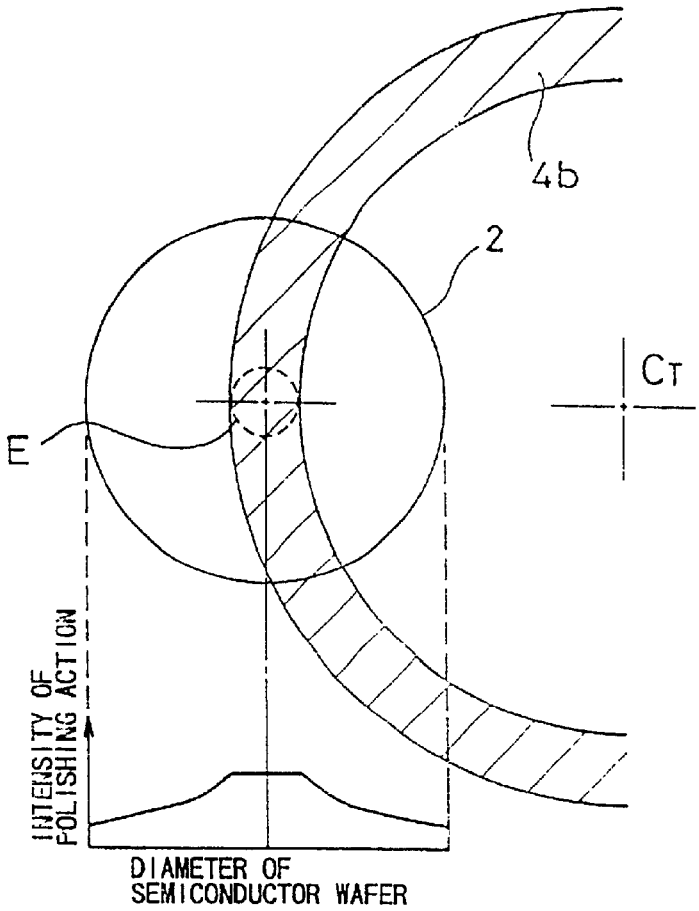
FIGS. 12A and 12B are plan views showing the manner in which the annular projecting region shown in FIGS. 11A and 11B operates.
Figure 12B:
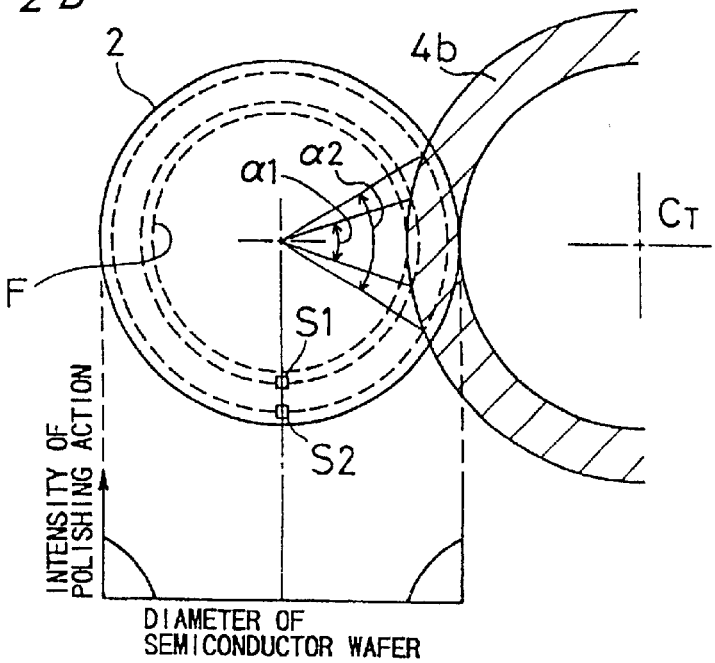

FIGS. 12A and 12B illustrate areas in which the projecting region 4b acts, and FIGS. 12A and 12B correspond to the FIGS. 11A and 11B, respectively. In FIG. 12A, since the projecting region 4b extends through the center of the semiconductor wafer 2 across the outer circumferential edge thereof, the projecting region 4b acts on the entire area of the semiconductor wafer 2 when the semiconductor wafer 2 rotates. A circular area E of the semiconductor wafer 2, which is indicated by the broken line in FIG. 12A, is held in contact with the projecting region 4b at all times. In FIG. 12B, inasmuch as the projecting region 4b contacts only an outer circumferential edge of the semiconductor wafer 2, the projecting region 4b does not act in a circular area of the semiconductor wafer 2 within a circle F indicated by the innermost broken line. In the area of the semiconductor wafer 2 which is contacted by the projecting region 4b, the degree to which the semiconductor wafer 2 contacts the projecting region 4b while the semiconductor wafer 2 makes one revolution varies in accordance with the distance from the center of the semiconductor wafer 2 in its surface. Specifically, as shown in FIG. 12B, a small area S1 in an inner circumferential zone of the area of the semiconductor wafer 2 which is held in contact with the projecting region 4b is contacted by the projecting region 4b through an angle $\alpha$1 during one revolution of the semiconductor wafer 2, whereas a small area S2 in an outer circumferential zone of the area of the semiconductor wafer 2 which is held in contact with the projecting region 4b is contacted by the projecting region 4b through an angle $\alpha$2 during one revolution of the semiconductor wafer 2. The angle $\alpha$2 is greater than the angle $\alpha$1.

Therefore, the area of the semiconductor wafer 2 in which the projecting region 4b acts contains different areas that are contacted by the projecting region 4b in different polishing degrees. The degree to which the projecting region 4b acts on the semiconductor wafer 2 is uniform in the same circumference, but varies radially, of the semiconductor wafer 2. FIGS. 12A and 12B show, in lower graphs thereof, respective distributions of degrees to which the projecting regions 4b shown in FIGS. 11A and 11B act on the semiconductor wafer 2 in the diametrical direction. In each of the graphs, the vertical axis represents the degree to which the projecting region 4b acts on the semiconductor wafer 2, i.e., the intensity of polishing action, and the horizontal axis represents the diameter of the semiconductor wafer 2.

In FIG. 12A, because the center of the semiconductor wafer 2 is contacted by the projecting region 4b at all times, the projecting region 4b acts on the semiconductor wafer 2 to the greatest degree at the center of the semiconductor wafer 2, so that the distribution curve has its peak at its center. In FIG. 12B, the projecting region 4b does not act on the center of the semiconductor wafer 2, but acts on the semiconductor wafer 2 to a greater degree in a radially outward direction, so that the distribution curve has its peak at its opposite ends.

With the configurations shown in FIGS. 11A, 11B and 12A, 12B, the projecting regions 4b act on the center and outer circumferential edge, respectively, of the semiconductor wafer 2. However, an annular projecting region may be positioned so as to extend intermediate between the center and outer circumferential edge of the semiconductor wafer 2, or may have a different width. Furthermore, the center of the semiconductor wafer 2 may be spaced from the center of the turntable 1 by a different distance, or a plurality of annular projecting regions having different diameters may be employed. These modifications may be selected singly or in combination to vary the area of the semiconductor wafer 2 in which the projecting region or regions 4b act or the degree to which the projecting region or regions 4b act on the semiconductor wafer 2.

Figure 13:
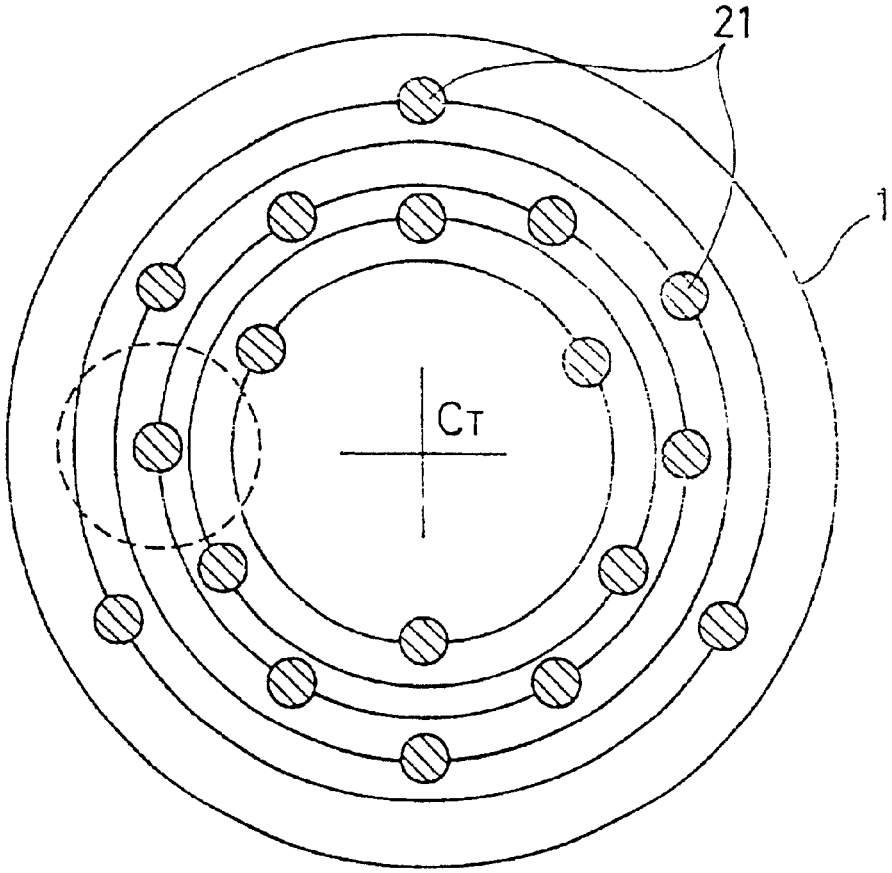
FIG. 13 is a plan view of a specific structure of projecting regions on the upper surface of the turntable of the polishing apparatus.
Figure 14:
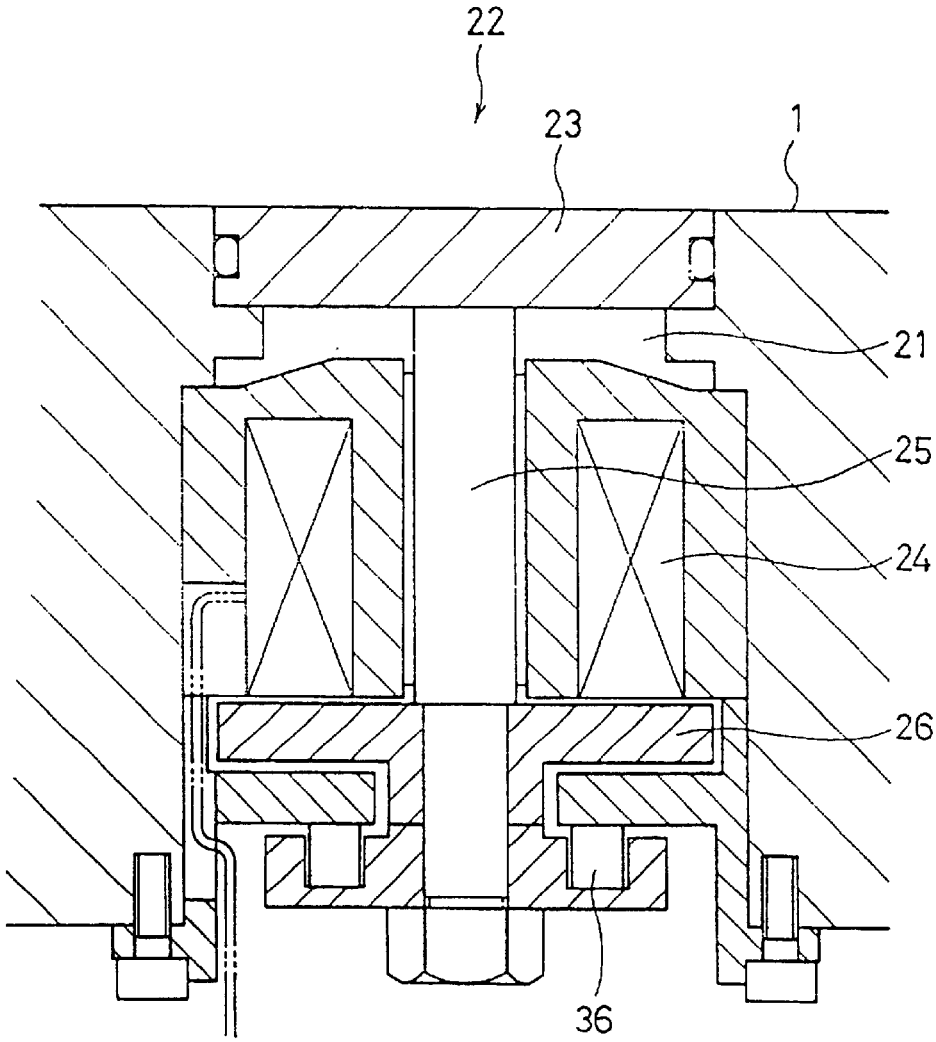
FIG. 14 is an enlarged fragmentary vertical cross-sectional view of a projecting region on the upper surface of the turntable of the polishing apparatus shown in FIG. 13.

A specific structure of projecting regions on the upper surface of the turntable 1 of the polishing apparatus will be described below with reference to FIGS. 13 and 14. As shown in FIG. 13, the turntable 1 has a plurality of small circular cavities 21 defined therein on five concentric circles of different diameters which are concentric with the center $C_T$ of the turntable 1. As shown in FIG. 14, each of the cavities 21 houses an actuator 22 for forming a projecting region on the upper surface of the turntable 1 under electromagnetic forces.

The actuator 22 comprises a movable plate 23 connected to a plate 26 by a vertical shaft 25, and an electromagnet 24 disposed around the vertical shaft 25 between the movable plate 23 and the plate 26. When an electric current is supplied to the coil of the electromagnet 24, the plate 26 is upwardly attracted to the electromagnet 24, thus pushing the movable plate 23 upwardly above the upper surface of the turntable 1. When no electric current is supplied to the coil of the electromagnet 24, the plate 26 is pulled away from the electromagnet 24 by a spring 36, thus lowering the movable plate 23 into a position which is the same plane as the upper surface of the turntable 1.

Figure 15:
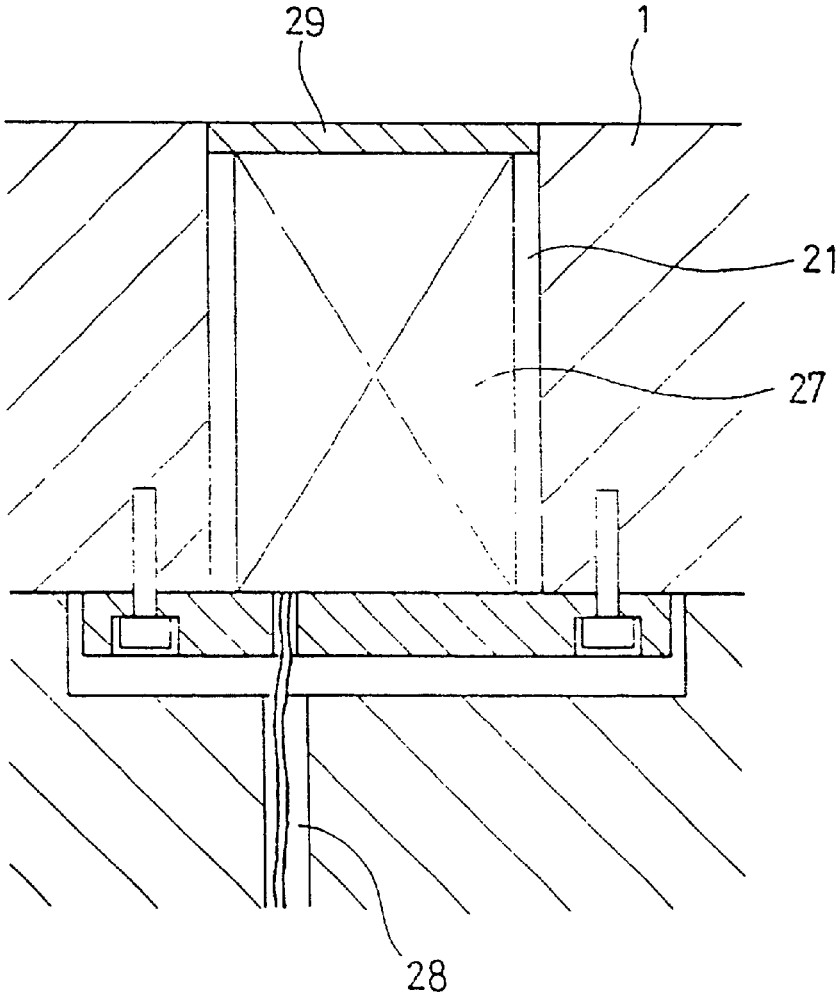
FIG. 15 is an enlarged fragmentary vertical cross-sectional view of a modified projecting region on the upper surface of the turntable of the polishing apparatus.
Figure 16:
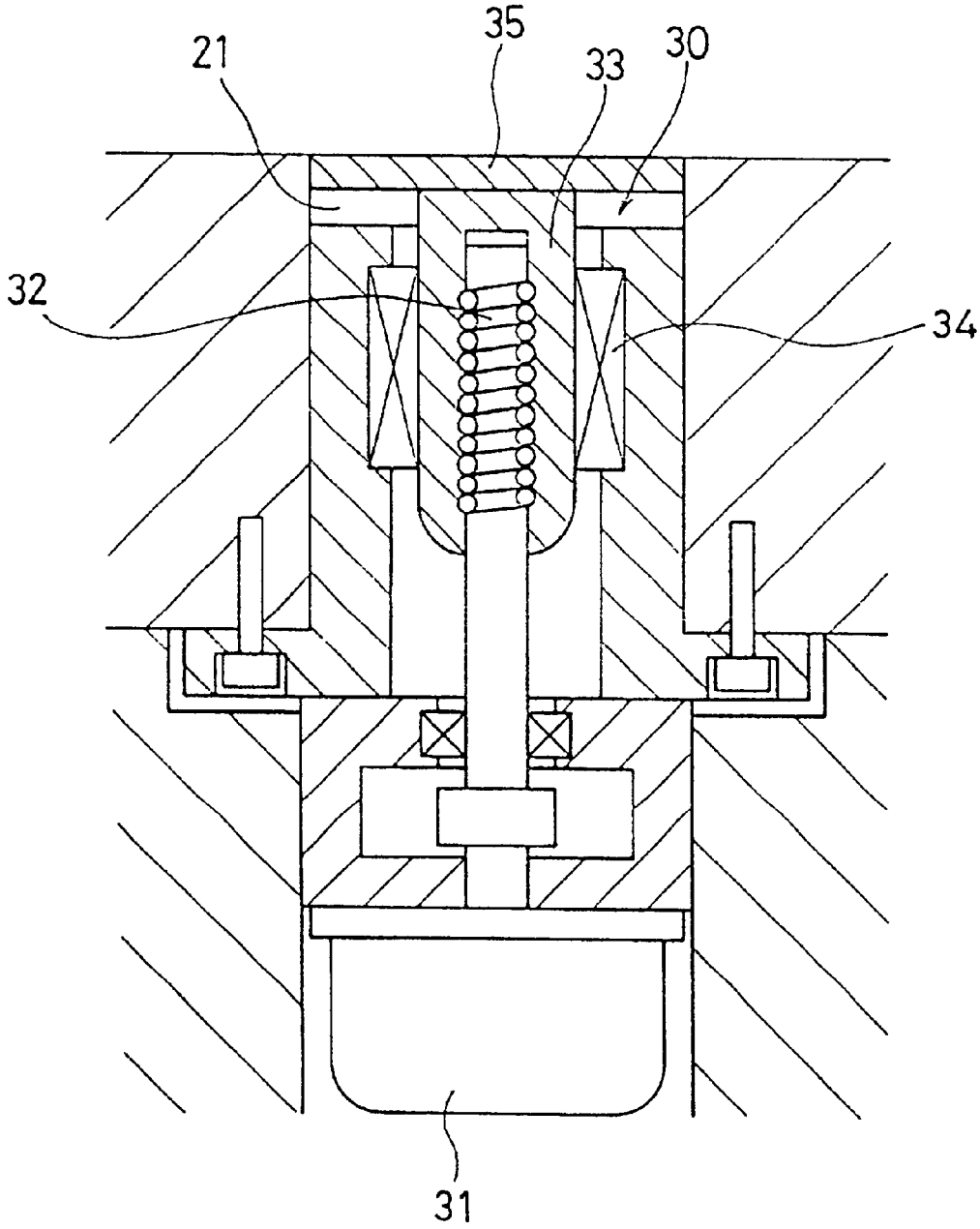
FIG. 16 is an enlarged fragmentary vertical cross-sectional view of another modified projecting region on the upper surface of the turntable of the polishing apparatus.

A projecting region may be formed on the upper surface of the turntable 1 by any of various other actuators than the electromagnetic actuator 22 shown in FIGS. 13 and 14. Examples of such other actuators are shown in FIGS. 15 and 16. The actuator shown in FIG. 15 comprises a piezoelectric actuator, and the actuator shown in FIG. 16 comprises a ball screw actuator. Each of the actuators shown in FIGS. 15 and 16 may be arranged to form projecting regions in the pattern shown in FIG. 13.

In FIG. 15, the piezoelectric actuator comprises a piezoelectric element 27 disposed in a cavity 21 defined in the turntable 1, and a hole 28 is formed in the turntable 1 for accommodating leads for applying a voltage therethrough to the piezoelectric element 27. When a voltage is applied through the leads to the piezoelectric element 27, the piezoelectric element 27 is expanded vertically to project a movable plate 29 on the piezoelectric element 27 above the upper surface of the turntable 1. When no voltage is applied to the piezoelectric element 27, the piezoelectric element 27 is contracted vertically to retract the movable plate 29 into a position which is the same plane as the upper surface of the turntable 1.

In FIG. 16, the ball screw actuator comprises a lifting mechanism 30 disposed in a cavity 21 formed in the turntable 1. The lifting mechanism 30 comprises a stepping motor 31, a ball screw 32 connected to the shaft of the stepping motor 31, a slider 33 engaging the ball screw 32, and a bearing 34 which supports the slider 33 for vertical movement. When the shaft of the stepping motor 31 is rotated in one direction upon actuation of the stepping motor 31, the ball screw 32 lifts the slider 33 to project a movable plate 35 above the upper surface of the turntable 1. When the shaft of the stepping motor 31 is rotated in the opposite direction, the ball screw 32 lowers the slider 33 to retract the movable plate 35 into a position which is the same plane as the upper surface of the turntable 1.

Figure 17:
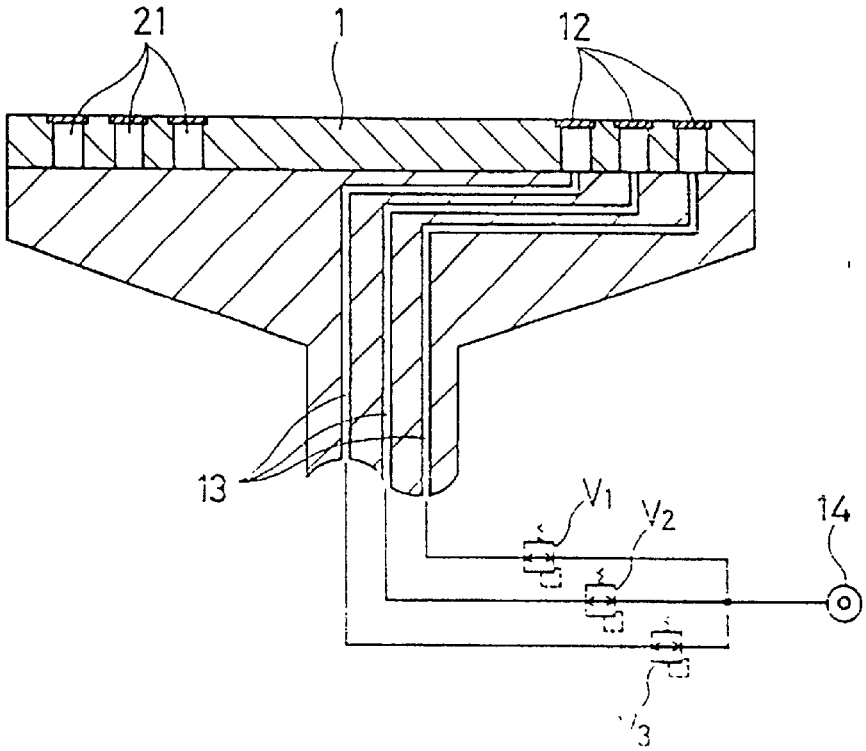
FIG. 17 is a vertical cross-sectional view of another specific structure of annular projecting regions on the upper surface of the turntable of the polishing apparatus.
Figure 18:
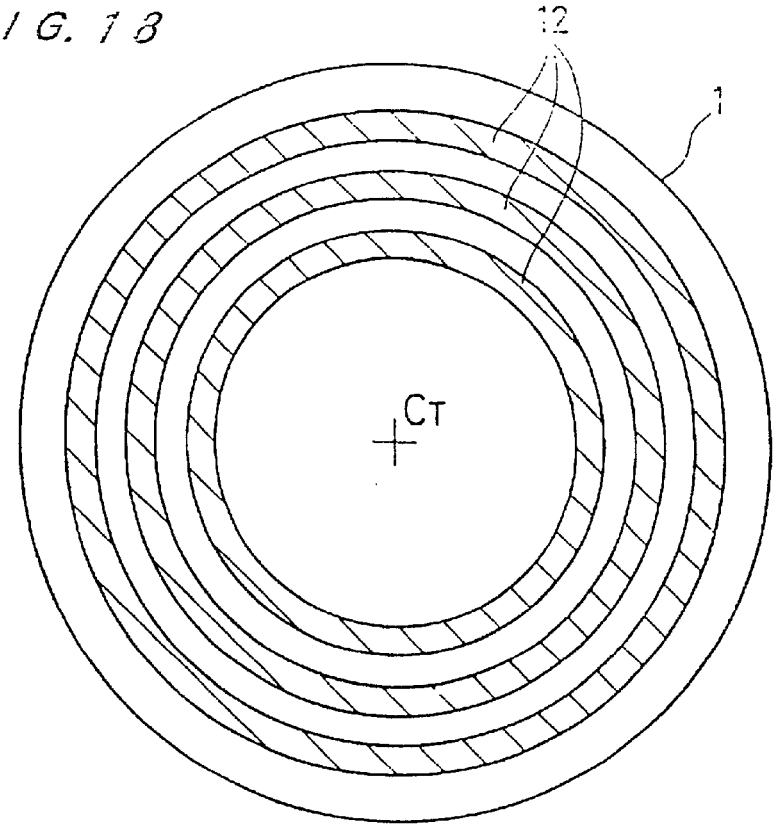
FIG. 18 is a plan view of the specific structure of annular projecting regions on the upper surface of the turntable of the polishing apparatus shown in FIG. 17.
Figure 19:
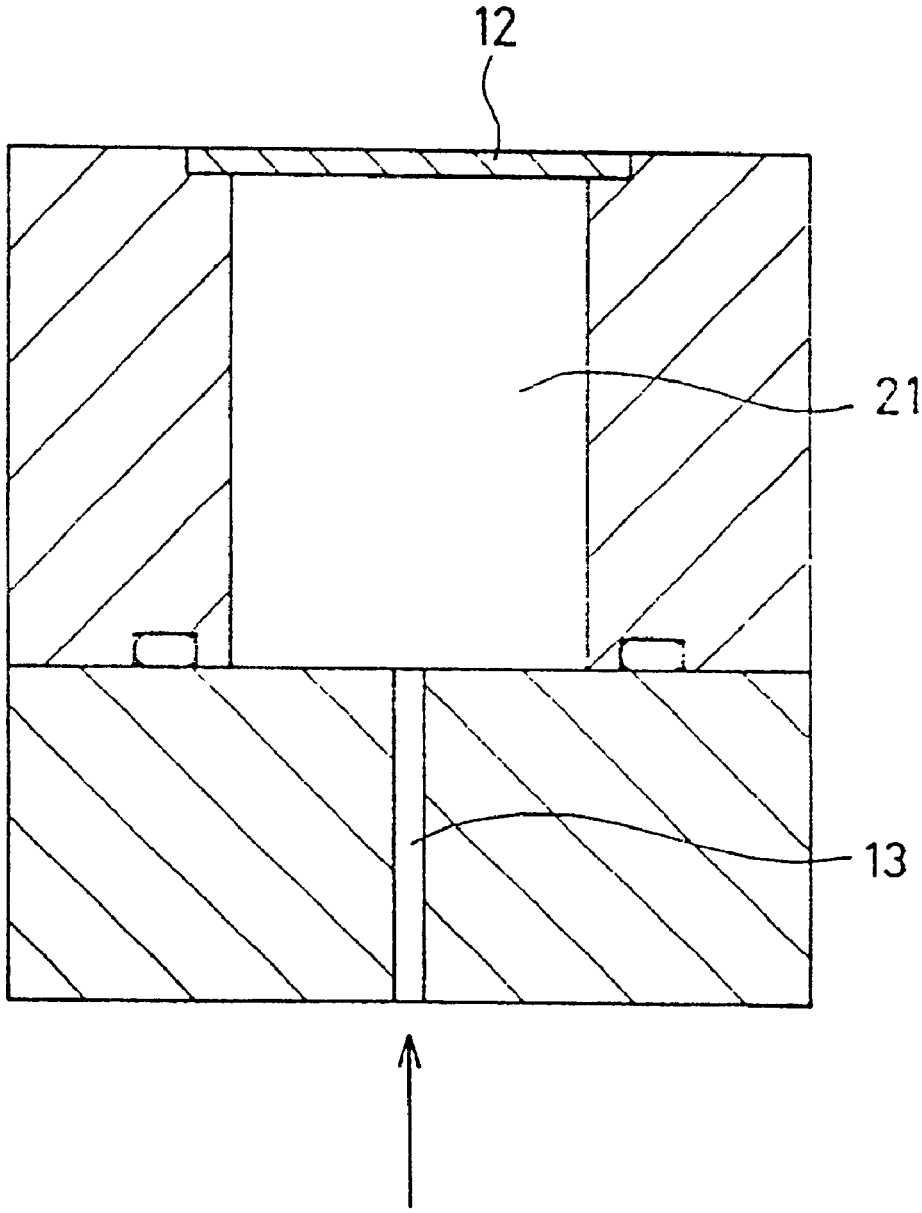
FIG. 19 is an enlarged fragmentary vertical cross-sectional view of a projecting region on the upper surface of the turntable of the polishing apparatus shown in FIG. 17.

FIGS. 17 through 19 show another specific structure of projecting regions on the upper surface of the turntable 1 of the polishing apparatus. The turntable 1 has three annular cavities 21 defined therein concentrically with the center $C_T$ of the turntable 1. The annular cavities 21 have open upper ends, at the upper surface of the turntable 1, which are hermetically closed respectively by annular thin plates 12 whose inner and outer circumferential edges are welded to the turntable 1. The annular cavities 21 communicate with respective air passages 13 defined in the turntable 1 and extending downwardly. The air passages 13 are connected to a compressed air source 14 through respective independent pipes having respective regulators (air pressure regulating valves) $V_1$, $V_2$, $V_3$.

When compressed air is supplied from the compressed air source 14 to the annular cavities 21, the thin plates 12 project upwardly above the upper surface of the turntable 1 under an air pressure in the annular cavities 21. The height to which the thin plates 12 project upwardly can be controlled by varying the supplied air pressure with the regulators $V_1$, $V_2$, $V_3$. When the semiconductor wafer is polished, since the abrasive cloth 4 is attached to the upper surface of the turntable 1, the abrasive cloth 4 also projects upwardly at positions corresponding to the thin plates 12 when the thin plates 12 project upwardly. The height to which the abrasive cloth 4 projects upwardly can be controlled by the regulators $V_1$, $V_2$, $V_3$, and the regulators $V_1$, $V_2$, $V_3$ can be controlled to regulate respective air pressures to produce a desired combination of different heights to which the abrasive cloth 4 projects upwardly at the corresponding positions. In this manner, the semiconductor wafer 2 can be polished intensively at a desired area or areas thereon.

Figure 20A:
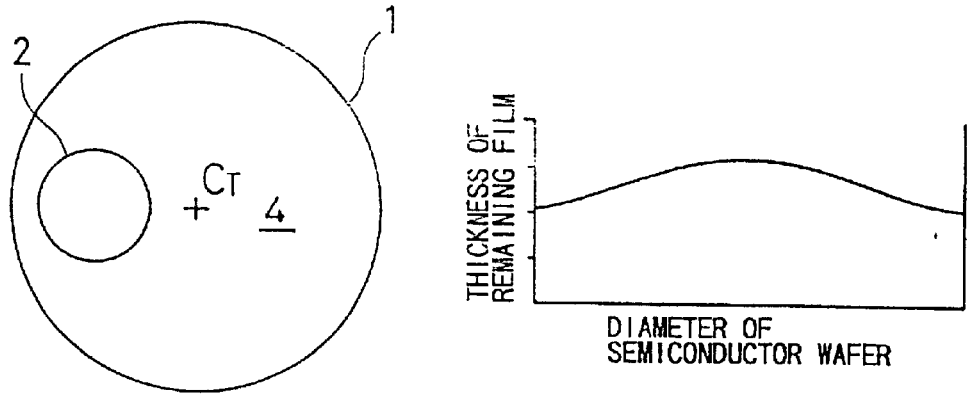
FIGS. 20A, 20B, and 20C are views showing comparison between a polishing apparatus according to the present invention and a conventional polishing apparatus.
Figure 20B:
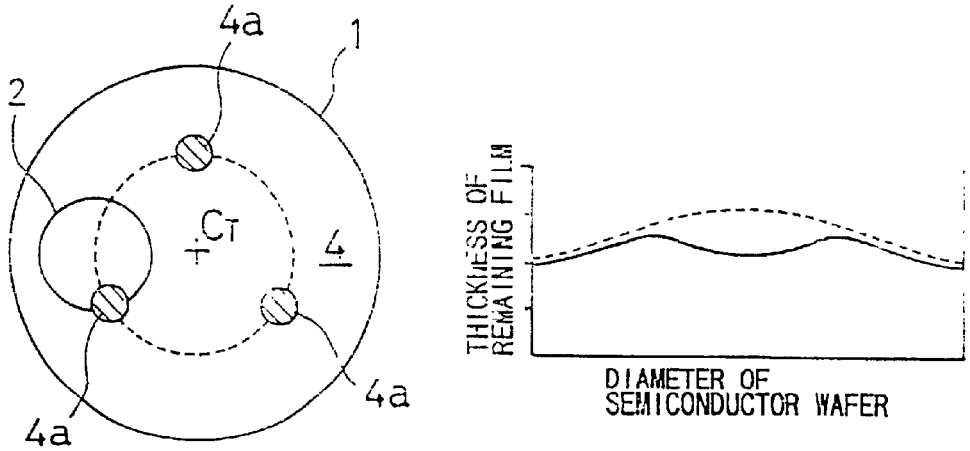
Figure 20C:
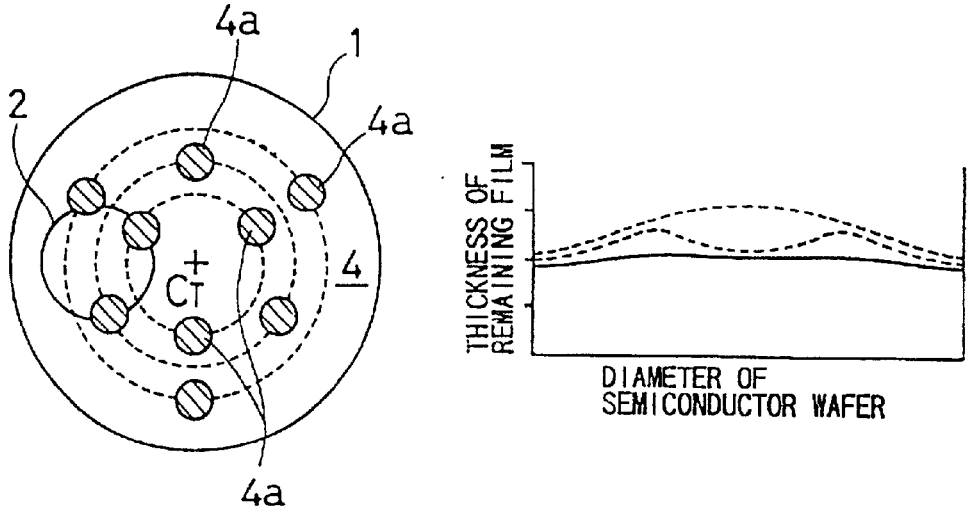

FIGS. 20A, 20B, and 20C show advantages of polishing apparatus according to the present invention.

FIG. 20A shows the result of a polishing action which was effected, by a conventional polishing apparatus, on a semiconductor wafer 2 which has an insulating film of silicon oxide ($SiO_2$) deposited on a substrate of silicon (Si). FIG. 20A shows a turntable 1 on its left-hand side, and a graph on its right-hand side which indicates the thickness of an insulating film remaining on the substrate after the polishing action. The graph has a vertical axis representing the thickness of the remaining insulating film and a horizontal axis representing the diameter of the semiconductor wafer 2. The abrasive cloth was made of polyurethane foam, and the abrasive liquid was of a general composition with silica particles dispersed in an alkaline solution. It can be seen from FIG. 20A that the thickness of the remaining insulating film is large in a central area of the semiconductor wafer and the polished surface of the semiconductor wafer was not flat.

FIG. 20B shows the result of a polishing action effected on the same kind of semiconductor wafer by a polishing apparatus according to the present invention. As shown in FIG. 20B on its left-hand side, the turntable 1 has a circular pattern of projecting regions on its upper surface which form respective projecting regions 4a on the upper surface of the abrasive cloth 4 at such positions as to pass through the center of the semiconductor wafer 2. After the semiconductor wafer 2 was polished, the thickness of the remaining insulating film was reduced in its central area, i.e., the central area of the semiconductor wafer 2 was polished to a greater degree. Thus the flatness of the polished semiconductor wafer 2 was increased as compared with the semiconductor wafer 2 shown in FIG. 20A, as can be understood from a graph on the right-hand side of FIG. 20B.

FIG. 20C shows the result of a polishing action effected on the same kind of semiconductor wafer by another polishing apparatus according to the present invention. As shown in FIG. 20C on its left-hand side, the turntable 1 has concentric circular patterns of projecting regions on its upper surface which form respective projecting regions 4a on the upper surface of the abrasive cloth 4 at such positions as to pass through the center and other intermediate portions of the semiconductor wafer 2. After the semiconductor wafer 2 was polished, the thickness of the remaining insulating film was reduced in its central and intermediate areas, i.e., the central and intermediate areas of the semiconductor wafer 2 were polished to a greater degree. Thus the flatness of the polished semiconductor wafer 2 was increased as compared with the semiconductor wafer 2 shown in FIG. 20B, as can be understood from a graph on the right-hand side of FIG. 20C.

The positions of projecting regions formed on the abrasive cloth at positions for contact with the semiconductor wafer 2 are determined based on the area of the semiconductor wafer 2 in which the projecting regions are to act, and the number and size of such projecting regions are appropriately determined to achieve a desired polishing condition on the semiconductor wafer 2.

After the semiconductor wafer 2 has been polished, the abrasive cloth 4 may be dressed in preparation for the polishing of a next semiconductor wafer. The abrasive cloth 4 may be dressed by pressing a brush or diamond pellets against the abrasive cloth 4 while supplying water to the abrasive cloth 4. The dressing of the abrasive cloth 4 is necessary to dress the fibers of the abrasive cloth 4 and remove any remaining abrasive material in the abrasive liquid from the abrasive cloth 4. When the abrasive cloth 4 is dressed, it is flattened by eliminating any projecting regions therefrom.

Figure 21:
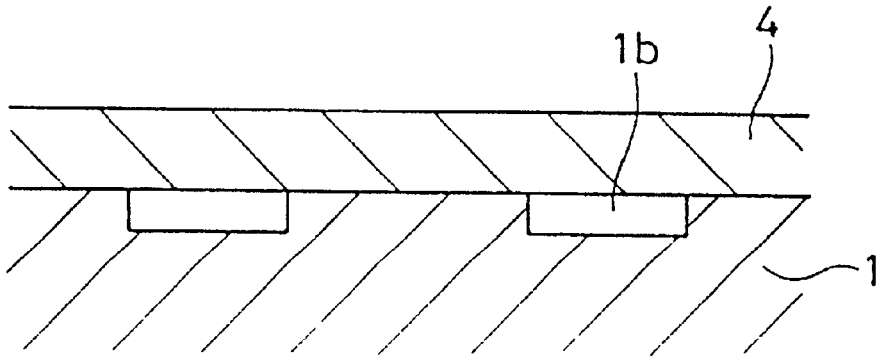
FIG. 21 is an enlarged fragmentary vertical cross-sectional view of a polishing apparatus according to another embodiment of the present invention.

FIG. 21 shows in enlarged fragmentary vertical cross section a polishing apparatus according to another embodiment of the present invention. According to the embodiment shown in FIG. 21, a turntable 1 has recesses 1b defined in an upper surface thereof, and an abrasive cloth 4 is attached to the upper surface of the turntable 1. The polishing apparatus shown in FIG. 21 effects a polishing action in a manner which is a reversal of the polishing action effected by the polishing apparatus with the projecting regions. To be more specific, the abrasive cloth 4 has a weaker polishing ability at locations corresponding to the recesses 1b than other areas, and hence a semiconductor wafer is polished to a smaller degree at such locations by the abrasive cloth 4 held in contact with the semiconductor wafer. Any irregularities of the degree to which the semiconductor wafer is polished, due to an unequal supply of abrasive liquid and an unequal distribution of abrasive liquid on the abrasive cloth 4, and the period of time when the abrasive cloth 4 has been used, can be corrected by positioning the recesses 1b so as to act on such areas of the semiconductor wafer which tend to be excessively polished. Rather than defining such recesses 1b in the turntable 1, any of the actuators shown in FIGS. 14 through 17 may be arranged so as to operate backwards to form recesses in the surface of the abrasive cloth 4 which is held in contact with the semiconductor wafer. Specifically, the movable plates 23, 29, 35 (see FIGS. 14, 15, 16) may be lowered or a negative pressure may be developed in the cavities 21 (see FIG. 17) to form recesses in the surface of the abrasive cloth 4.

Figure 22:
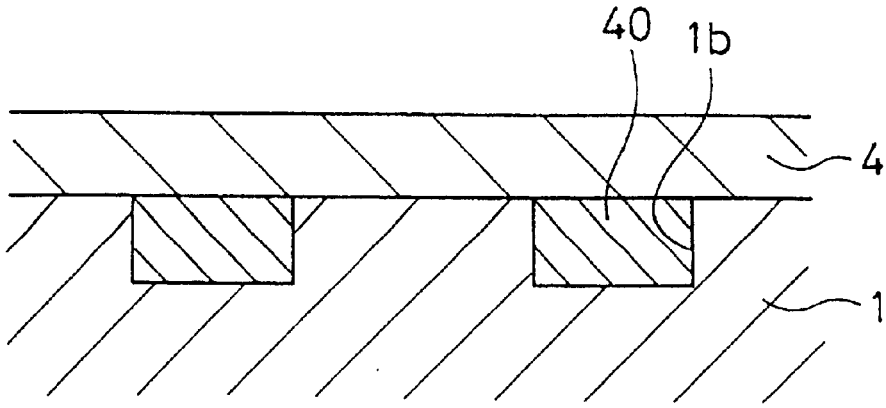
FIG. 22 is an enlarged fragmentary vertical cross-sectional view of a polishing apparatus according to still another embodiment of the present invention.

FIG. 22 is an enlarged fragmentary vertical cross-sectional view of a polishing apparatus according to still another embodiment of the present invention. According to the embodiment shown in FIG. 22, a turntable 1 has recesses 1b defined in an upper surface thereof. The recesses 1b are filled with elastic members 40, and an abrasive cloth 4 is attached to the upper surface of the turntable 1. The polishing apparatus shown in FIG. 22 operates in substantially the same manner as the polishing apparatus shown in FIG. 21. Specifically, the abrasive cloth 4 has a weaker polishing ability at locations corresponding to the elastic members 40 disposed in the recesses 1b than other areas, and hence a semiconductor wafer is polished to a smaller degree at such locations by the abrasive cloth 4 held in contact with the semiconductor wafer. The elastic members 40, which are typically made of rubber, have a thickness which is the same as the depth of the recesses 1b such that the elastic members 40 have respective upper surfaces in the same plane as the upper surface of the turntable 1.

A polishing apparatus according to still another embodiment of the present invention will be described below.

The polishing apparatus according to this embodiment has actuators disposed in a turntable for selectively forming corresponding projecting regions on an upper surface of the turntable. Each of the actuators may be an electromagnetic actuator such as shown in FIG. 14 for selectively forming a projecting region under electromagnetic forces. Specifically, when an electric current is supplied to the actuator, the actuator forms a projecting region on the upper surface of the turntable. When the supply of an electric current is stopped, the upper surface of the turntable returns to a flat shape. Therefore, the actuator can selectively form a projecting region on the upper surface of the turntable.

The actuators may be arranged to form projecting regions in the pattern shown in FIG. 13.

When an actuator passes over the lower surface of a semiconductor wafer while the semiconductor wafer is being polished, the actuator follows the path as shown in FIG. 6. If a projecting region is formed on the upper surface of the turntable by the actuator at all times, then the projecting region acts on the semiconductor wafer along the entire path, i.e., the semiconductor wafer is polished more positively along the entire path by the projecting region than in other areas of the semiconductor wafer.

If the path is divided into smaller areas, then it is possible to control the polishing rate in each of such smaller areas. In order to achieve such a selective polishing action, the actuator is selectively operated to form a projecting region in a portion of the path while the actuator is moving over the lower surface of the semiconductor wafer.

Figure 23:
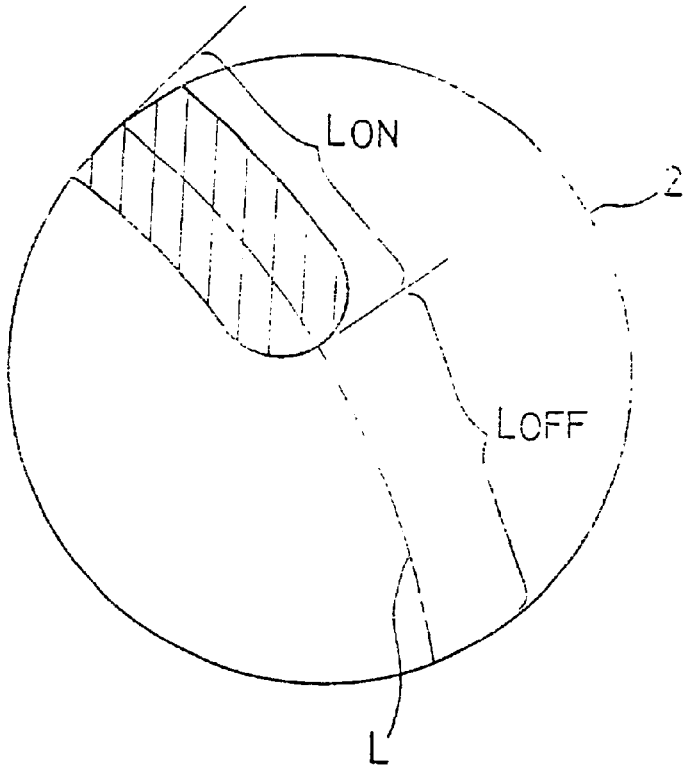
FIG. 23 is a plan view showing areas in which a projecting region acts and does not act when an actuator is turned on and off along a path on a semiconductor wafer.

FIG. 23 shows areas in which a projecting region acts and does not act when an actuator is turned on and off along a path. In FIG. 23, while the actuator is moving along a path $L_{OFF}$, the actuator is turned off, and no projecting region is formed on the turntable. Therefore, no polishing action is produced by any projecting region while the actuator is moving along the path $L_{OFF}$. Then, while the actuator is moving along a path $L_{ON}$, the actuator is turned on to form a projecting region on the turntable. Now, the projecting region acts on a semiconductor wafer in an area along the path $L_{ON}$, which is smaller than the area that is developed all along the path when the actuator is turned on at all times.

When a projection area is selectively formed in a portion of the path along which the actuator moves, the polishing action can be controlled in a finely adjusted manner.

The actuator may be turned on momentarily at any spot on the path. In such a case, a projecting region formed on the turntable by the actuator acts on the semiconductor wafer only in the area of the momentarily produced projecting region. With such momentary operation of the actuator, it is possible to polish the semiconductor wafer more intensively at a certain spot by synchronizing the rotational speeds of the semiconductor wafer and the turntable with each other.

The time at which the actuator is to be turned on may be determined by detecting the angular displacement of the turntable with a rotary encoder and determining whether the actuator is positioned below the semiconductor wafer.

While the selective formation of a projection area on the turntable has been described in this embodiment, a recess can also selectively be formed in the turntable in the same manner as described above.

Although certain preferred embodiments of the present invention have been shown and described in detail, it should be understood that various changes and modifications may be made therein without departing from the scope of the appended claims.

What is claimed is:

1. A polishing apparatus comprising:

a turntable;

an abrasive cloth mounted on an upper surface of said turntable;

a top ring disposed above said turntable for supporting a workpiece to be polished and pressing the workpiece against said abrasive cloth;

moving means for moving said turntable and said top ring relative to each other, thereby to cause said abrasive cloth supported by said turntable to polish a surface of the workpiece pressed by said top ring against said abrasive cloth, during which polishing at least one area of the surface of the workpiece tends to be polished more intensively at a higher polishing rate than at least one other area of the surface of the workpiece, thus tending to create polishing irregularities on the surface of the workpiece; and said abrasive cloth having [an actuatable region] *actuatable regions individually and independently* operable to be selectively caused to form therein [a recess] *recesses*, and said [recess] *recesses* being located at [a position] *positions* relative to said top ring to come into contact with the at least one area of the surface of the workpiece and thus forming means to perform less intensive polishing of the at least one area, while [a region] *regions* of said abrasive cloth other than at said [recess is] *recesses are* operable to contact the at least one other area of the surface of the workpiece to perform a more intensive polishing thereof, and thereby to correct the polishing irregularities.

2. A polishing apparatus according to claim 1, wherein said [position] *positions* of said [recess is] *recesses are* selectable in a radial direction of said turntable.

3. An apparatus for polishing a semiconductor wafer to a flat mirror finish, said apparatus comprising:

a turntable having an abrasive cloth mounted on an upper surface thereof;

a top ring disposed above said turntable for supporting a wafer to be polished and for pressing the wafer against said abrasive cloth, said top ring having a lower wafer-holding area against which the wafer is held during pressing thereof against said abrasive cloth;

moving means for moving said turntable and said top ring relative to each other, thereby to cause said abrasive cloth supported by said turntable to polish a surface of the wafer pressed by said top ring against said abrasive cloth, during which polishing areas of the surface of the wafer tend to be polished less intensively at a lower polishing rate than at least one other area of the surface of the wafer, thus tending to create polishing irregularities on the surface of the wafer; and means for polishing the areas of the surface of the wafer more intensively than the at least one other area of the surface of the wafer and thereby to correct the polishing irregularities thereof, said means comprising:

cavities defined in said upper surface of said turntable;

members mounted in said cavities for movement therein to positions to project above said upper surface of said turntable and to cause portions of said abrasive cloth to project upwardly as a projecting regions;

said projecting regions each having a dimension in a radial direction of said turntable that is smaller than a diameter of said wafer-holding area of said top ring;

said projecting regions being located at positions relative to said top ring to come into greater contact with the areas of the surface of the wafer than with the at least one other area of the surface of the wafer; and said members being individually and independently operable.

4. An apparatus for polishing a semiconductor wafer to a flat mirror finish, said apparatus comprising:

a turntable having an abrasive cloth mounted on an upper surface thereof;

a top ring disposed above said turntable for supporting a wafer to be polished and for pressing the wafer against said abrasive cloth, said top ring having a lower wafer-holding area against which the wafer is held during pressing thereof against said abrasive cloth;

moving means for moving said turntable and said top ring relative to each other, thereby to cause said abrasive cloth supported by said turntable to polish a surface of the wafer pressed by said top ring against said abrasive cloth, during which polishing areas of the surface of the wafer tend to be polished less intensively at a lower polishing rate than at least one other area of the surface of the wafer, thus tending to create polishing irregularities on the surface of the wafer; and means for polishing the areas of the surface of the wafer more intensively than the at least one other area of the surface of the wafer and thereby to correct the polishing irregularities thereof, said means comprising:

cavities defined in said upper surface of said turntable;

means for supplying compressed air into said cavities to cause portions of said abrasive cloth to project upwardly above said upper surface of said turntable as projecting regions;

said projecting regions each having a dimension in a radial direction of said turntable that is smaller than a diameter of said wafer-holding area of said top ring;

said projecting regions being located at positions relative to said top ring to come into greater contact with the areas of the surface of the wafer than with the at least one other area of the surface of the wafer; and said projecting regions being individually and independently operable.

5. An apparatus for polishing a semiconductor wafer to a flat mirror finish, said apparatus comprising:

a turntable having an abrasive cloth mounted on an upper surface thereof;

a top ring disposed above said turntable for supporting a wafer to be polished and for pressing the wafer against said abrasive cloth, said top ring having a lower wafer-holding area against which the wafer is held during pressing thereof against said abrasive cloth;

moving means for moving said turntable and said top ring relative to each other, thereby to cause said abrasive cloth supported by said turntable to polish a surface of the wafer pressed by said top ring against said abrasive cloth, during which polishing areas of the surface of the wafer tend to be polished more intensively at a higher polishing rate than at least one other area of the surface of the wafer, thus tending to create polishing irregularities on the surface of the wafer; and means for polishing the areas of the surface of the wafer less intensively than the at least one other area of the surface of the wafer and thereby to correct the polishing irregularities thereof, said means comprising:

cavities defined in said upper surface of said turntable;

members mounted in said cavities for movement therein to positions inwardly of said upper surface of said turntable and to form recesses therein;

said recesses each having a dimension in a radial direction of said turntable that is smaller than a diameter of said wafer-holding area of said top ring;

said recesses being located at positions relative to said top ring to come into greater contact with the areas of the surface of the wafer than with the at least one other area of the surface of the wafer; and said members being individually and independently operable.

6. An apparatus for polishing a semiconductor wafer to a flat mirror finish, said apparatus comprising:

a turntable having an abrasive cloth mounted on an upper surface thereof;

a top ring disposed above said turntable for supporting a wafer to be polished and for pressing the wafer against said abrasive cloth, said top ring having a lower wafer-holding area against which the wafer is held during pressing thereof against said abrasive cloth;

moving means for moving said turntable and said top ring relative to each other, thereby to cause said abrasive cloth supported by said turntable to polish a surface of the wafer pressed by said top ring against said abrasive cloth, during which polishing areas of the surface of the wafer tend to be polished less intensively at a lower polishing rate than at least one other area of the surface of the wafer, thus tending to create polishing irregularities on the surface of the wafer; and means for polishing the areas of the surface of the wafer more intensively than the at least one other area of the surface of the wafer and thereby to correct the polishing irregularities thereof, said means comprising:

a surface of said abrasive cloth having a non-projecting region and projecting regions extending upwardly from said non-projecting region;

said projecting regions each having a dimension in a radial direction of said turntable that is smaller than a diameter of said wafer-holding area of said top ring;

said projecting regions having a height and being located at positions relative to said top ring to come into contact with the areas of the surface of the wafer, while said non-projecting region comes into contact with the at least one other area of the surface of the wafer; and said projecting regions being individually and independently operable to project above said non-projecting region.

7. A polishing apparatus according to claim 6, wherein said abrasive cloth has a plurality of projecting regions, at least one of number or size on said projecting regions being selectable.

8. A polishing apparatus according to claim 6, wherein said projecting region has an adjustable height.

9. A polishing apparatus according to claim 6, wherein an upper surface of said turntable has a projecting region forming said projecting region of said abrasive cloth.

10. A polishing apparatus according to claim 6, wherein said projecting region has a circular shape.

11. A polishing apparatus according to claim 6, wherein said projecting region is annular.

12. A polishing apparatus according to claim 6, wherein said position of said projecting region is selectable in a radial direction of said turntable.

13. An apparatus for polishing a semiconductor wafer to a flat mirror finish, said apparatus comprising:

a turntable having an abrasive cloth mounted on an upper surface thereof;

a top ring disposed above said turntable for supporting a wafer to be polished and for pressing the wafer against said abrasive cloth, said top ring having a lower wafer-holding area against which the wafer is held during pressing thereof against said abrasive cloth;

moving means for moving said turntable and said top ring relative to each other, thereby to cause said abrasive cloth supported by said turntable to polish a surface of the wafer pressed by said top ring against said abrasive cloth, during which polishing areas of the surface of the wafer tend to be polished more intensively at a higher polishing rate than at least one other area of the surface of the wafer, thus tending to create polishing irregularities on the surface of the wafer; and means for polishing the areas of the surface of the wafer less intensively than the at least one other area of the surface of the wafer and thereby to correct the polishing irregularities thereof, said means comprising:

recesses formed in said upper surface of said turntable, said recesses being covered by said abrasive cloth;

said recesses each having a dimension in a radial direction of said turntable that is smaller than a diameter of said wafer-holding area of said top ring;

said recesses being located at positions relative to said top ring such that portions of said abrasive cloth covering said recesses come into contact with the areas of the surface of the wafer, while a region of said abrasive cloth other than said portions covering said recesses comes into contact with the at least one other area of the surface of the wafer; and said portions of said abrasive cloth covering said recesses being individually and independently operable.

14. A polishing apparatus according to claim 13, wherein said turntable has a plurality of recesses, at least one of number and size of said recesses being selectable.

15. A polishing apparatus according to claim 13, wherein said recess has an adjustable depth.

16. A polishing apparatus according to claim 13, wherein said recess has a circular shape.

17. A polishing apparatus according to claim 13, wherein said recess is annular.

18. A polishing apparatus according to claim 13, wherein said position of said recess is selectable in a radial direction of said turntable.

19. An apparatus for polishing a semiconductor wafer to a flat mirror finish, said apparatus comprising:

a turntable having an abrasive cloth mounted on an upper surface thereof;

a top ring disposed above said turntable for supporting a wafer to be polished and for pressing the wafer against said abrasive cloth, said top ring having a lower wafer-holding area against which the wafer is held during pressing thereof against said abrasive cloth;

moving means for moving said turntable and said top ring relative to each other, thereby to cause said abrasive cloth supported by said turntable to polish a surface of the wafer pressed by said top ring against said abrasive cloth, during which polishing areas of the surface of the wafer tend to be polished less intensively at a lower polishing rate than at least one other area of the surface of the wafer, thus tending to create polishing irregularities on the surface of the wafer; and means for polishing the areas of the surface of the wafer more intensively than the at least one other area of the surface of the wafer and thereby to correct the polishing irregularities thereof, said means comprising:

said abrasive cloth having a non-projecting region and actuatable regions operable to be selectively caused to project upwardly from said non-projecting region as projecting regions;

said projecting regions each having a dimension in a radial direction of said turntable that is smaller than a diameter of said wafer-holding area of said top ring;

said projecting regions each having a height and being located at positions relative to said top ring to come into contact with the areas of the surface of the wafer, while said non-projecting region comes into contact with the at least one other area of the surface of the wafer; and said actuatable regions being individually and independently operable.

20. A polishing apparatus according to claim 19, wherein said position of said projecting region is selectable in a radial direction of said turntable.

21. An apparatus for polishing a semiconductor wafer to a flat mirror finish, said apparatus comprising:

a turntable having an abrasive cloth mounted on an upper surface thereof;

a top ring disposed above said turntable for supporting a wafer to be polished and for pressing the wafer against said abrasive cloth, said top ring having a lower wafer-holding area against which the wafer is held during pressing thereof against said abrasive cloth;

moving means for moving said turntable and said top ring relative to each other, thereby to cause said abrasive cloth supported by said turntable to polish a surface of the wafer pressed by said top ring against said abrasive cloth, during which polishing at least one area of the surface of the wafer tends to be polished more intensively at a higher polishing rate than at least one other area of the surface of the wafer, thus tending to create polishing irregularities on the surface of the wafer; and means for polishing the at least one area of the surface of the wafer less intensively than the at least one other area of the surface of the wafer and thereby to correct the polishing irregularities thereof, said means comprising:

an annular recess formed in said upper surface of said turntable, said recess being covered by said abrasive cloth;

said annular recess having a dimension in a radial direction of said turntable that is smaller than a diameter of said wafer-holding area of said top ring; and said annular recess being located at a position relative to said top ring to come into contact with the at least one area of the surface of the wafer, while a region of said abrasive cloth other than that covering said annular recess comes into contact with the at least one other area of the surface of the wafer.

*22. A polishing apparatus for polishing a semiconductor wafer to a flat mirror finish, said apparatus comprising:*

*an abrasive cloth having a contact surface which contacts a surface of a wafer to be polished during polishing;*

*a top ring for supporting the wafer and pressing the wafer against said abrasive cloth; and*

*moving means for moving a plurality of portions of said abrasive cloth to be higher than another portion of said abrasive cloth so that said plurality of portions of said abrasive cloth are individually and independently pressed against the wafer by air pressures.*

*23. A polishing apparatus according to claim 22, further comprising a plurality of passages supplying the air pressures to said plurality of portions and being connected to respective regulators;*

*wherein said regulators control individually and independently the air pressures.*

*24. A polishing apparatus according to claim 23, further comprising a plurality of cavities corresponding to said plurality of portions of said abrasive cloth and connected to said passages respectively.*

*25. A polishing apparatus according to claim 22, wherein said abrasive cloth is pressed against the wafer by air pressure through a thin plate.*

* * * * *

UNITED STATES PATENT AND TRADEMARK OFFICE

CERTIFICATE OF CORRECTION

PATENT NO. : RE 39,262 E
APPLICATION NO. : 09/821046
DATED : September 5, 2006
INVENTOR(S) : Masayoshi Hirose et al.

It is certified that error appears in the above-identified patent and that said Letters Patent is hereby corrected as shown below:

TITLE PAGE In Item (22), please change "Filed: Feb. 28, 2002" to --Filed: March 30, 2001--.

Signed and Sealed this

Nineteenth Day of December, 2006

JON W. DUDAS
*Director of the United States Patent and Trademark Office*